United States Patent
Hasegawa et al.

(10) Patent No.: US 9,729,826 B2
(45) Date of Patent: Aug. 8, 2017

(54) COMMUNICATION MANAGEMENT SYSTEM, COMMUNICATION SYSTEM, AND COMMUNICATION MANAGEMENT METHOD

(71) Applicants: Takashi Hasegawa, Kanagawa (JP); Takeshi Homma, Kanagawa (JP)

(72) Inventors: Takashi Hasegawa, Kanagawa (JP); Takeshi Homma, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/269,380

(22) Filed: Sep. 19, 2016

(65) Prior Publication Data

US 2017/0094224 A1    Mar. 30, 2017

(30) Foreign Application Priority Data

Sep. 28, 2015 (JP) ................................. 2015-189576

(51) Int. Cl.
*H04N 7/15* (2006.01)
*H04L 29/06* (2006.01)

(52) U.S. Cl.
CPC ........... *H04N 7/15* (2013.01); *H04L 65/1069* (2013.01)

(58) Field of Classification Search
None
See application file for complete search history.

(56) References Cited

U.S. PATENT DOCUMENTS

| 2013/0063537 | A1* | 3/2013 | Emori | H04N 7/147 348/14.01 |
| 2014/0173463 | A1* | 6/2014 | Mitchell | H04N 7/142 715/753 |
| 2014/0267559 | A1 | 9/2014 | Krantz et al. | |
| 2016/0099893 | A1 | 4/2016 | Hasegawa et al. | |
| 2016/0112465 | A1 | 4/2016 | Hasegawa et al. | |
| 2016/0353060 | A1* | 12/2016 | Su | H04N 7/152 |

FOREIGN PATENT DOCUMENTS

JP        2012-178135        9/2012

\* cited by examiner

*Primary Examiner* — Creighton Smith
(74) *Attorney, Agent, or Firm* — Oblon, McClelland, Maier & Neustadt, L.L.P.

(57) ABSTRACT

A communication management system and a method of managing communication. The communication management system and the method of managing communication includes receiving, from a first shared communication terminal to be shared by a plurality of users at a first site, a communication start request for starting a video communication between the first shared communication terminal and a second shared communication terminal at a second site, the communication start request including first shared communication terminal identification information for identifying the first shared communication terminal and first personal communication terminal identification information for identifying a first personal communication terminal personalized to a first user of the plurality of users who requests to start the video communication using the first shared communication terminal, and storing, in a memory, the first shared communication terminal identification information and the first personal communication terminal identification information in association with each other.

14 Claims, 23 Drawing Sheets

FIG. 9

AUTHENTICATION
MANAGEMENT TABLE

| TERMINAL ID | PASSWORD |
|---|---|
| 01aa | aaaa |
| 01ab | abab |
| 01ba | baba |
| ... | ... |

FIG. 10

TERMINAL MANAGEMENT TABLE

| TERMINAL ID | NAME OF DESTINATION ADDRESS | OPERATING STATUS | RECEIVED DATE AND TIME | IP ADDRESS OF TERMINAL |
|---|---|---|---|---|
| 01aa | AA TERMINAL, TOKYO OFFICE, JAPAN | ONLINE (COMMUNICATION ESTABLISHED) | 2015.4.10.13:40 | 1.2.1.3 |
| 01ab | AB, TOKYO OFFICE, JAPAN | ONLINE (COMMUNICATION ESTABLISHED) | 2015.4.09.12:00 | 1.2.1.4 |
| 01ac | AC, TOKYO OFFICE, JAPAN | ONLINE (COMMUNICATION ESTABLISHED) | 2015.4.09.12:30 | 1.2.1.5 |
| ... | ... | ... | ... | ... |
| 01ba | BA TERMINAL, BEIJING OFFICE, CHINA | ONLINE | 2015.4.10.13:45 | 1.2.2.3 |
| 01bb | BB, BEIJING OFFICE, CHINA | ONLINE (TEMPORARILY SUSPENDED) | 2015.4.10.13:50 | 1.2.2.4 |
| ... | ... | ... | ... | ... |
| 01ca | CA TERMINAL, WASHINGTON D. C. OFFICE, U.S. | ONLINE (COMMUNICATION ESTABLISHED) | 2015.4.10.12:45 | 1.3.1.3 |
| 01cb | CB, WASHINGTON D. C. OFFICE, U.S. | ONLINE (COMMUNICATION ESTABLISHED) | 2015.4.10.13:55 | 1.3.1.4 |
| ... | ... | ... | ... | ... |
| 01da | DA TERMINAL, BERLIN OFFICE, EUROPE | ONLINE (COMMUNICATION ESTABLISHED) | 2015.4.08.12:45 | 1.3.2.3 |
| 07db | DB, BERLIN OFFICE, EUROPE | ONLINE | 2015.4.10.12:45 | 1.3.2.4 |
| ... | ... | ... | ... | ... |

FIG. 11

CONTACT LIST MANAGEMENT TABLE

| STARTING TERMINAL ID | COUNTERPART TERMINAL ID |
|---|---|
| 01aa | 01ab, ···, 01ba, 01bb, ···, 01ca, 01cb, 01da, 01db, ··· |
| 01ab | 01aa, 01ca, 01cb, 01da |
| ··· | ··· |
| 01ba | 01aa, 01ab, 01ca, 01cb, 01da, 01db |
| ··· | ··· |
| 01da | 01aa, 01ab, 01ba, ···, 01da, 01ca, 01cb, ···, 01db |

FIG. 12

SESSION MANAGEMENT TABLE

| SESSION ID | RELAY DEVICE ID | STARTING TERMINAL ID | COUNTERPART TERMINAL ID | DELAY TIME | DELAY INFORMATION RECEIVED DATE AND TIME |
|---|---|---|---|---|---|
| se01 | 111a | 01aa | 01ca | 200 | 2015.4.10.13:41 |
| ... | ... | ... | ... | ... | ... |

FIG. 13

COMMUNICATION INFORMATION MANAGEMENT TABLE

| COMMUNICATION ID | TERMINAL ID OF SHARED COMMUNICATION TERMINAL | TERMINAL ID OF PERSONAL COMMUNICATION TERMINAL |
|---|---|---|
| co01 | 01aa | 01ab, 01ac |
| | 01ca | — |
| ... | ... | ... |

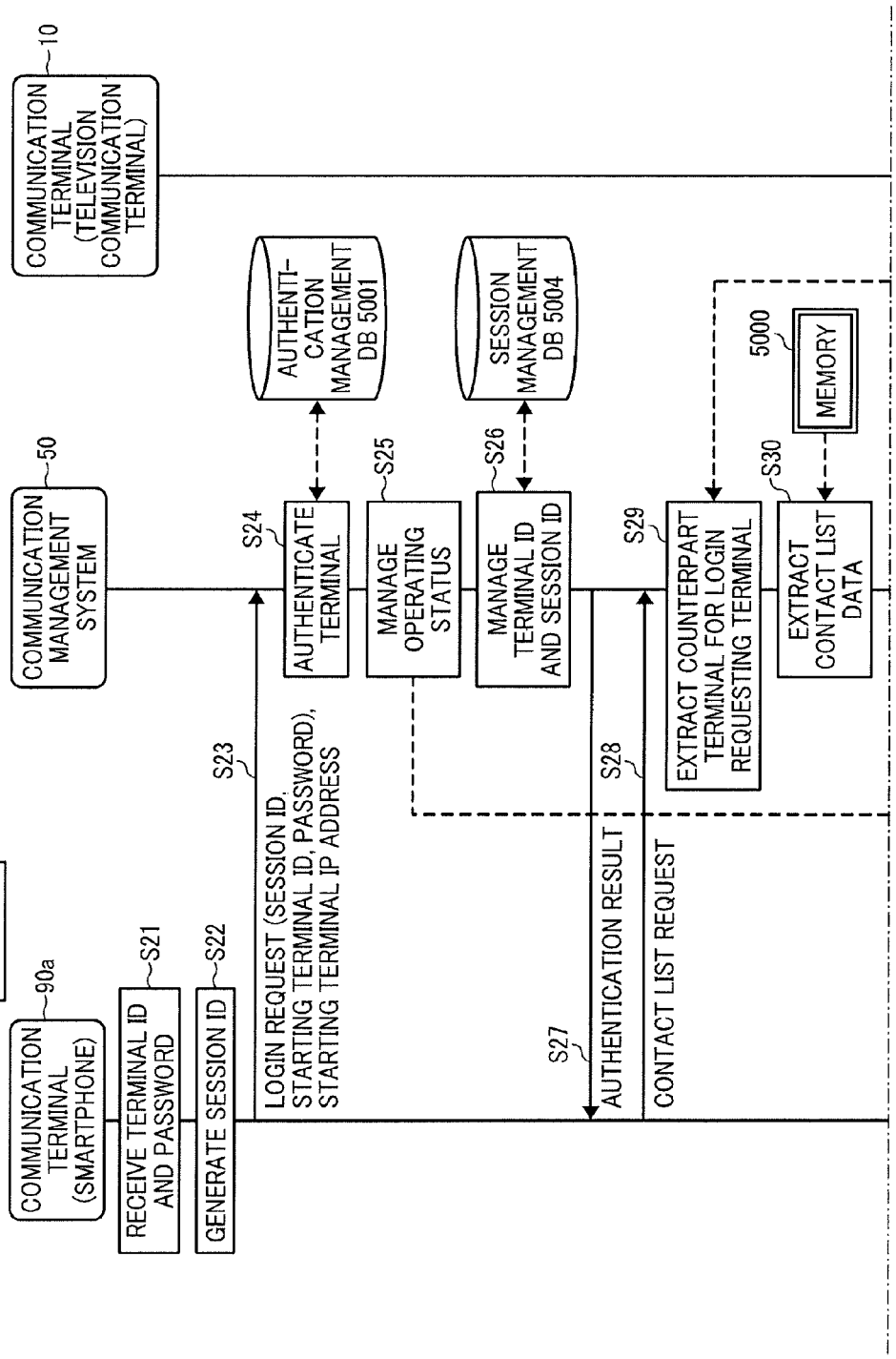

FIG. 15A
FIG. 15B
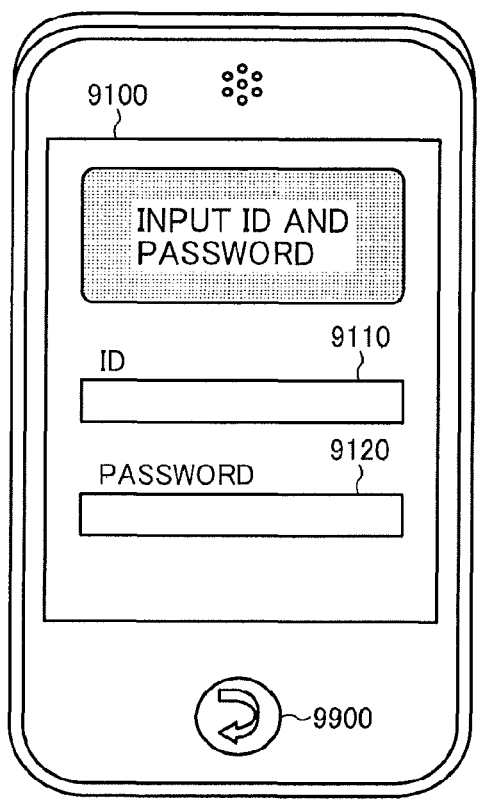
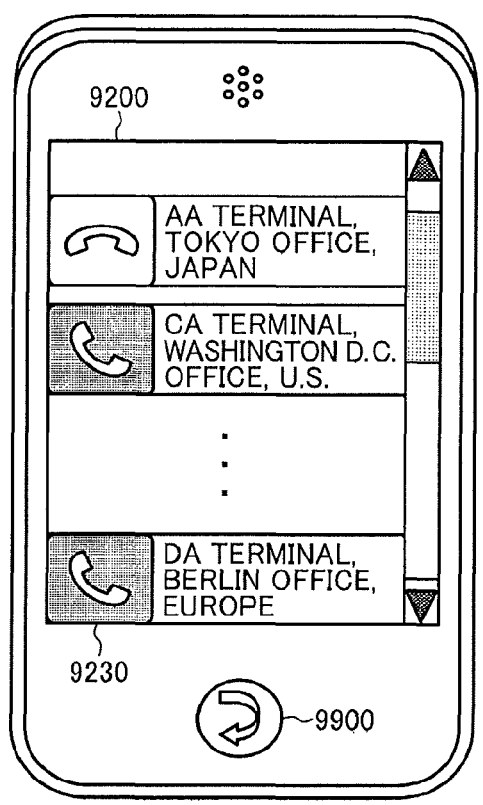

FIG. 15C

| STATUS | TERMINAL ID | CONTACT NAME |
|---|---|---|
| 📞 | 01aa | AA TERMINAL, TOKYO OFFICE, JAPAN |
| 📞 | 01ab | AB, TOKYO OFFICE, JAPAN |
| ⋮ | ⋮ | ⋮ |
| 📞 | 01db | DB, BERLIN OFFICE, EUROPE |
| QR CODE —1110 | | ⋮ |

1100

FIG. 16A  FIG. 16 [FIG. 16A | FIG. 16B]
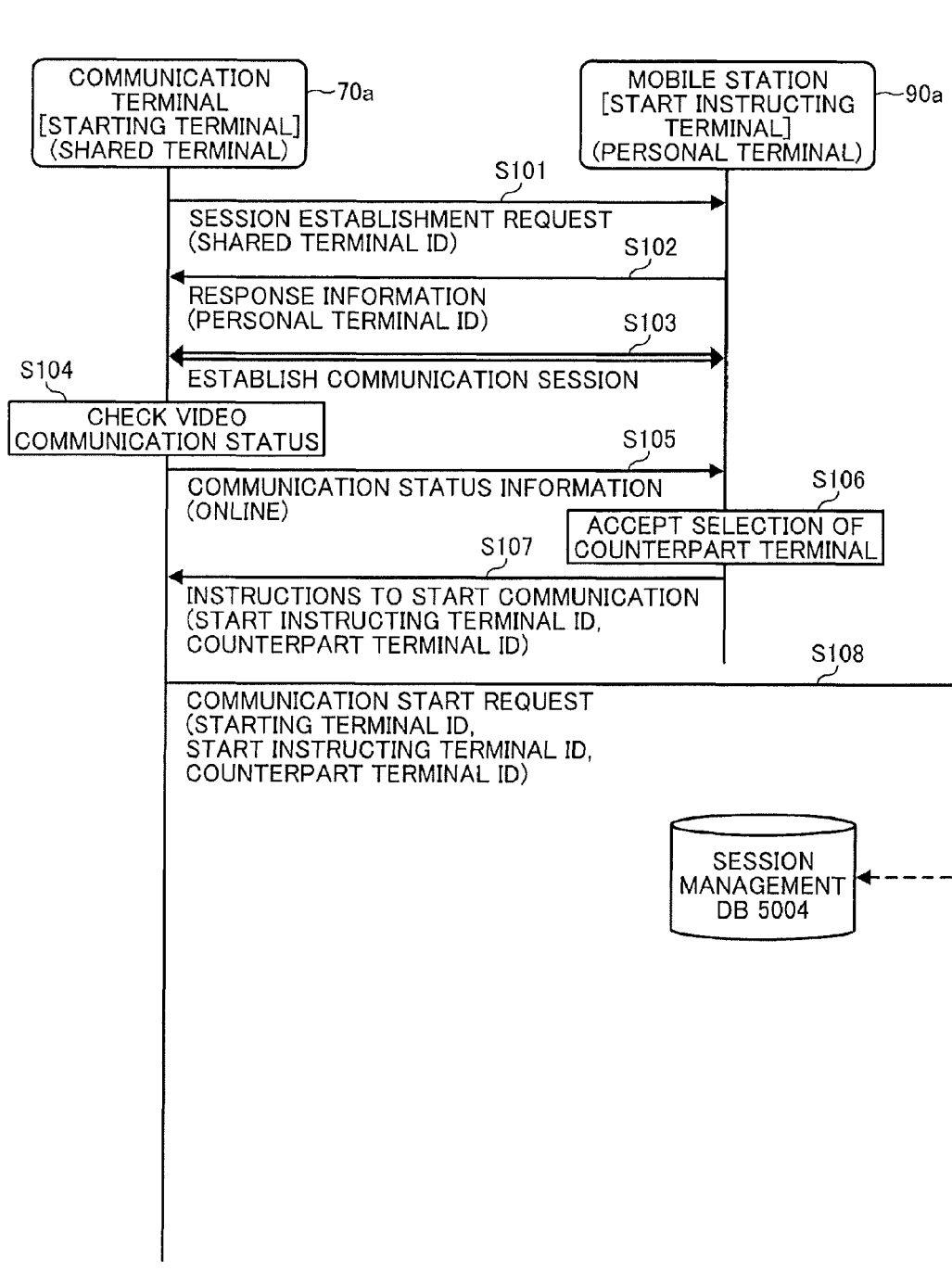

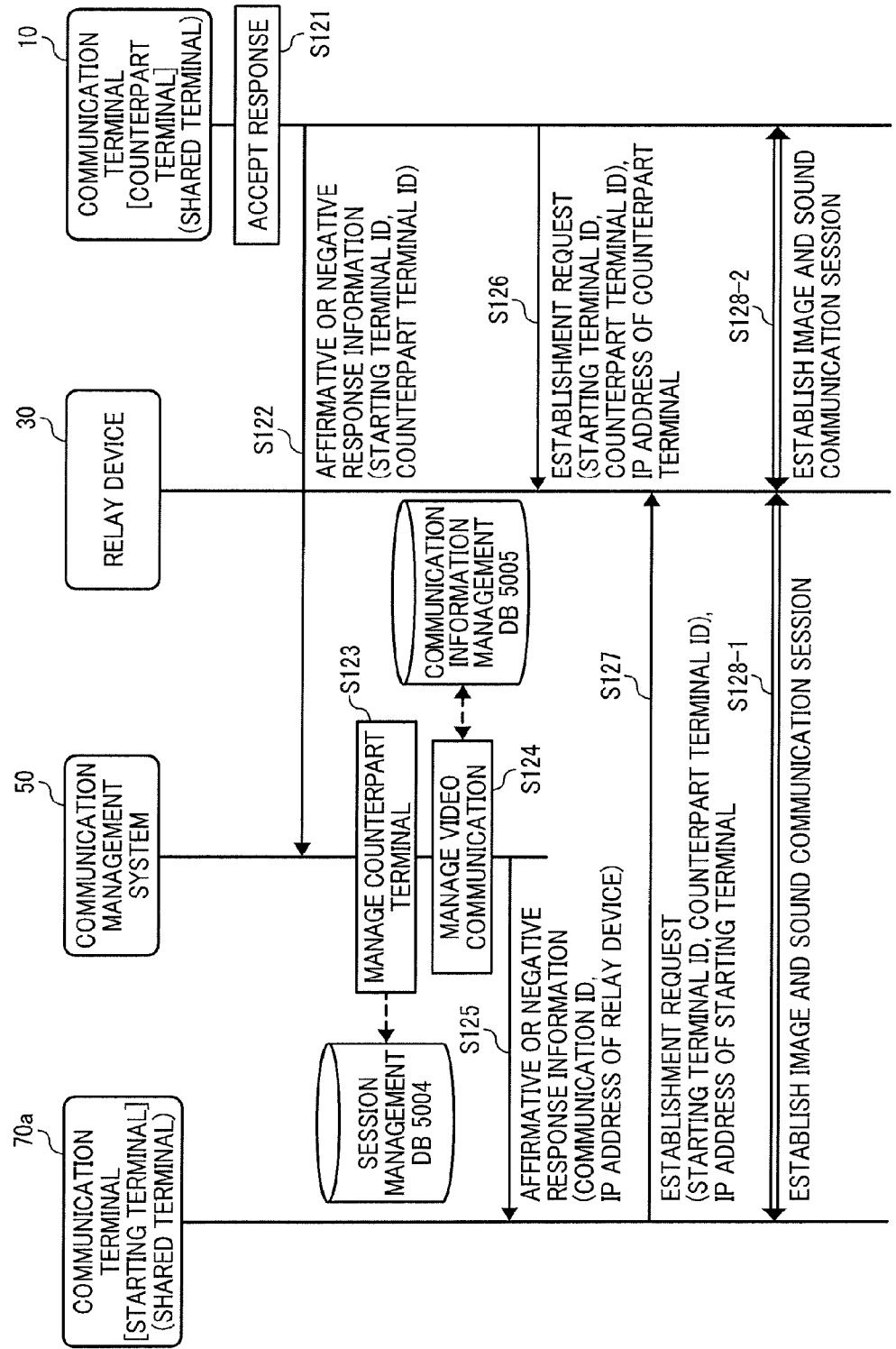

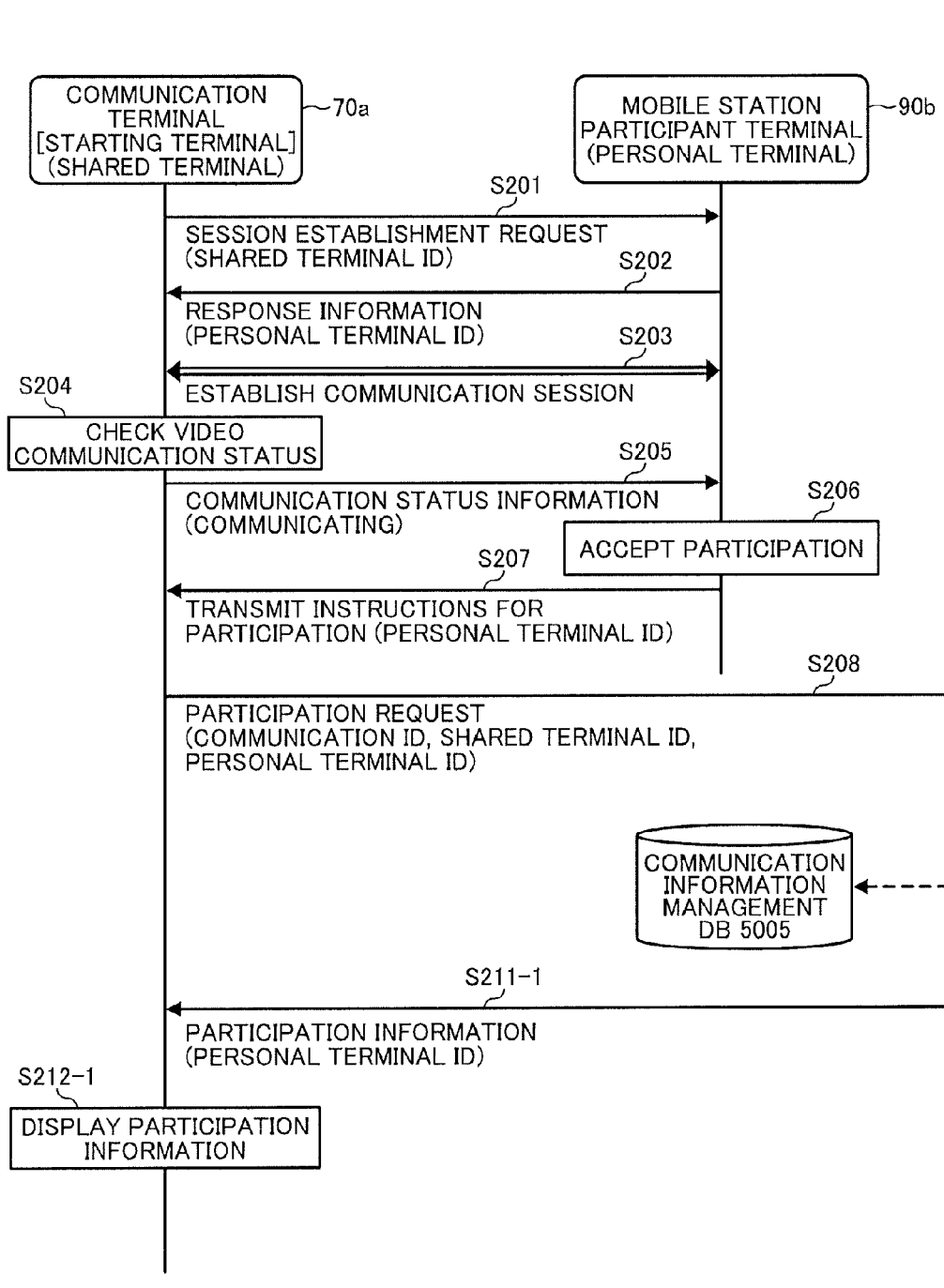

COMMUNICATION MANAGEMENT SYSTEM, COMMUNICATION SYSTEM, AND COMMUNICATION MANAGEMENT METHOD

CROSS-REFERENCE TO RELATED APPLICATION

This patent application is based on and claims priority pursuant to 35 U.S.C. §119(a) to Japanese Patent Application No. 2015-189576, filed on Sep. 28, 2015, in the Japan Patent Office, the entire disclosure of which is hereby incorporated by reference herein.

BACKGROUND

Technical Field

Embodiments of the present invention relate to a communication management system, a communication system, and a communication management method.

Background Art

With the increased need for reducing the cost of business trip and the time spent for the business trip, systems with a plurality of communication terminals for arranging a video conference (teleconference) among a plurality of sites are now widely used. For example, video conference terminals are used as such communication terminals as above, and the video conference terminals directly transmit or receive image data and audio data among the video conference terminals to achieve teleconference or the like.

Moreover, electronic whiteboards are used as a communication terminal in recent years. When such electronic whiteboards are used, an image that is drawn on an electronic whiteboard at one site is displayed on an electronic whiteboard at another site. By so doing, teleconference or the like can be achieved.

Further, mobile stations such as smartphones are used as an example of a communication terminal. Such smartphones are relatively smaller than the video conference terminals, and mobile stations are personal communication terminals that are personalized to users. Thus, smartphones are usually carried by users. Accordingly, a user can easily start teleconference or the like with a counterpart terminal by using his/her mobile station.

SUMMARY

Embodiments of the present invention described herein provide a communication management system and a method of managing communication. The communication management system and the method of managing communication include receiving, from a first shared communication terminal to be shared by a plurality of users at a first site, a communication start request for starting a video communication between the first shared communication terminal and a second shared communication terminal at a second site, the communication start request including first shared communication terminal identification information for identifying the first shared communication terminal and first personal communication terminal identification information for identifying a first personal communication terminal personalized to a first user of the plurality of users who requests to start the video communication using the first shared communication terminal, and storing, in a memory, the first shared communication terminal identification information and the first personal communication terminal identification information in association with each other.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

FIG. 9 is a diagram illustrating an example data structure of an authentication management table, according to an embodiment of the present invention.

FIG. 10 is a diagram illustrating an example data structure of a terminal management table, according to an embodiment of the present invention.

FIG. 11 is a diagram illustrating an example data structure of a contact list management table, according to an embodiment of the present invention.

FIG. 12 is a diagram illustrating a session management table according to an embodiment of the present invention.

FIG. 13 is a diagram illustrating a communication information management table according to an embodiment of the present invention.

FIG. 14A and FIG. 14B are a data sequence diagram illustrating the operation of preparing for communication between the communication terminals of the communication system of FIG. 1, according to an embodiment of the present invention.

FIG. 15A illustrates an example of a login screen of a mobile station 90a, according to an embodiment of the present invention.

FIG. 15B illustrates an example of a contact list displayed on a mobile station 90a, according to an embodiment of the present invention.

FIG. 15C illustrates an example of a contact list displayed on a communication terminal 10, according to an embodiment of the present invention.

FIG. 16A and FIG. 16B are a sequence diagram illustrating the processes of starting video communication from a personal communication terminal through a shared communication terminal, according to an embodiment of the present invention.

FIG. 17 is a sequence diagram illustrating the processes of starting video communication from a personal communication terminal through a shared communication terminal, according to an embodiment of the present invention.

FIG. 18A and FIG. 18B are a sequence diagram illustrating the processes in which a personal communication terminal jumps in (additionally participates in) video communication, according to an embodiment of the present invention.

Figure 1:
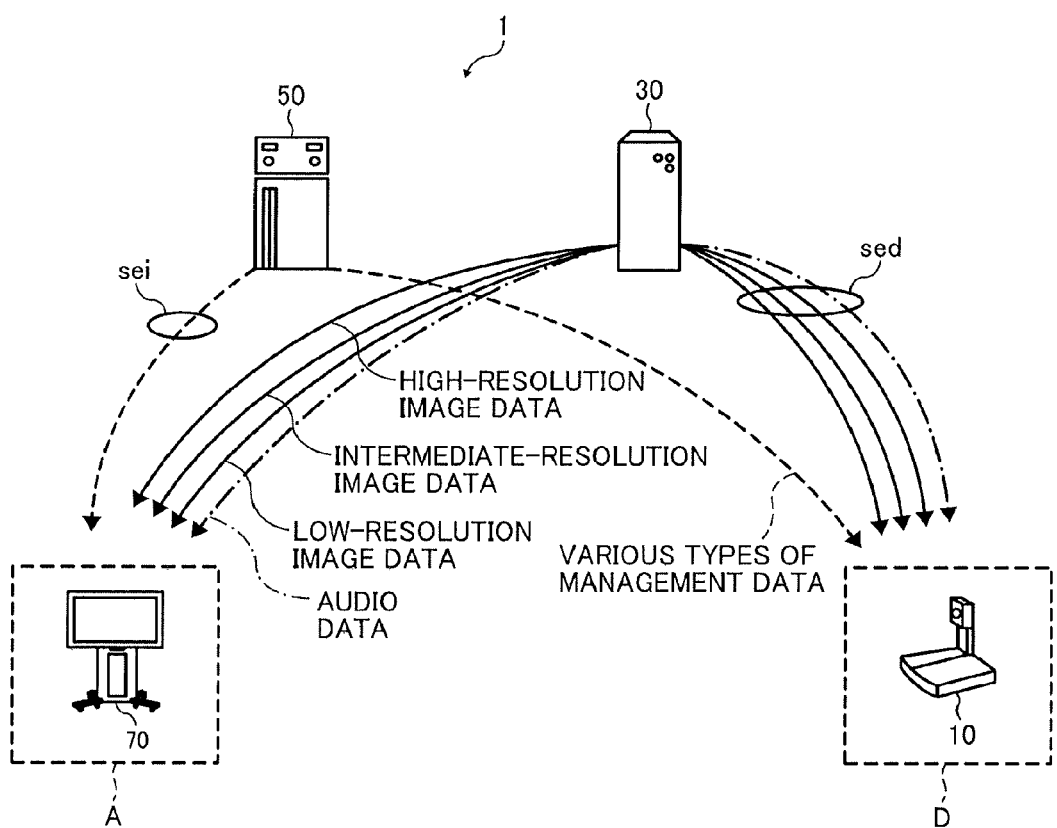
FIG. 1 is a schematic diagram illustrating a part of a communication system relating to video conference communication, according to an embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, an embodiment of the present invention is described with reference to the drawings.

<<Schematic Configuration of Communication System>>

Firstly, a communication system 1 that performs a video conference between a plurality of communication terminals 10 and 70 is described with reference to FIG. 1. FIG. 1 is a schematic diagram illustrating the communication of the video conference performed by the communication system according to an embodiment of the present invention.

Note that the "video conference" may also be referred to as a "television (TV) conference". Here, the video conference is described by way of example, but such a video conference may just be a simple conversation.

The communication system 1 includes the multiple communication terminals 10 and 70, a relay device 30, and a communication management system 50. The communication terminals 10 and 70 transmit and receive image data and audio data that are an example of the contents of data. In FIG. 1, a video conference terminal is depicted as an example of the communication terminal 10, and an electronic whiteboard is depicted as an example of the communication terminal 70. Note that image data may be a video image or a still image or both of the video image and the still image.

The communication terminal that serves as a requesting terminal that requests the start-up of a video conference is referred to as a "starting terminal", and the communication terminal that serves as a destination (relaying destination) of the request is referred to as a "counterpart terminal". In FIG. 1, the communication terminal 70 and the communication terminal 10 are referred to as a starting terminal and a counterpart terminal, respectively. However, when the communication terminal 10 requests to start a video conference with the communication terminal 70, the communication terminal 10 serves as a starting terminal, and the communication terminal 70 serves as a counterpart terminal. Note that the communication terminals 10 and 70 may be used not only for communication between different offices or for communication between different rooms in the same office, but also for communication within the same room or for outdoor-indoor communication or outdoor-outdoor communication.

The relay device 30 relays contents of data among a plurality of communication terminals 10 and 70. The communication management system 50 collectively manages the login authentication of the communication terminals 10 and 70, the communication status of the communication terminals 10 and 70, a contact list, the communication status of the relay device 30, or the like. The relay devices 30 and the communication management system 50 according to the present embodiment may be configured by a single computer or a plurality of computers to which functions are allocated as desired in a divided manner.

In the communication system 1, a management information session sei for sending and receiving various kinds of management information is established between the starting terminal and the counterpart terminal via the communication management system 50. Moreover, the four sessions of sending and receiving the four kinds of data including high-resolution image data, medium-resolution image data, low-resolution image data, and audio data are established between the starting terminal and the counterpart terminal via the relay device 30. In FIG. 1, these four sessions are collectively referred to as an image and audio data session sed. The image and audio data session "sed" does not necessarily include four sessions, but may include any number of sessions greater than or less than four. Alternatively, a communication session may directly be established between a starting terminal and a counterpart terminal without the relay device 30.

Here, the resolution of image data used in the present embodiment is described. The low-resolution image data serves as a base image, and has, for example, horizontal 160 pixels by vertical 120 pixels. The intermediate-resolution image data has, for example, horizontal 320 pixels by vertical 240 pixels. The high-resolution image data has, for example, horizontal 640 pixels by vertical 480 pixels. In the case of a narrow band path, low-quality image data that only includes low-resolution image data serving as a base image is relayed. In the case of a relatively wide band path, low-resolution image data that serves as a base image, and intermediate-quality image data including intermediate-resolution image data are relayed. In the case of a very wide band path, low-resolution image data that serves as a base image, intermediate-resolution image data, and high-quality image data including high-resolution image data are relayed. As audio data has a relatively small data size compared with image data, such audio data is relayed even in the case of a narrow band path.

<<Hardware Configuration according to Present Embodiment>>

Next, the hardware configuration according to the present embodiment is described.

<<Hardware Configuration of Video Conference Terminal>>

Figure 2:
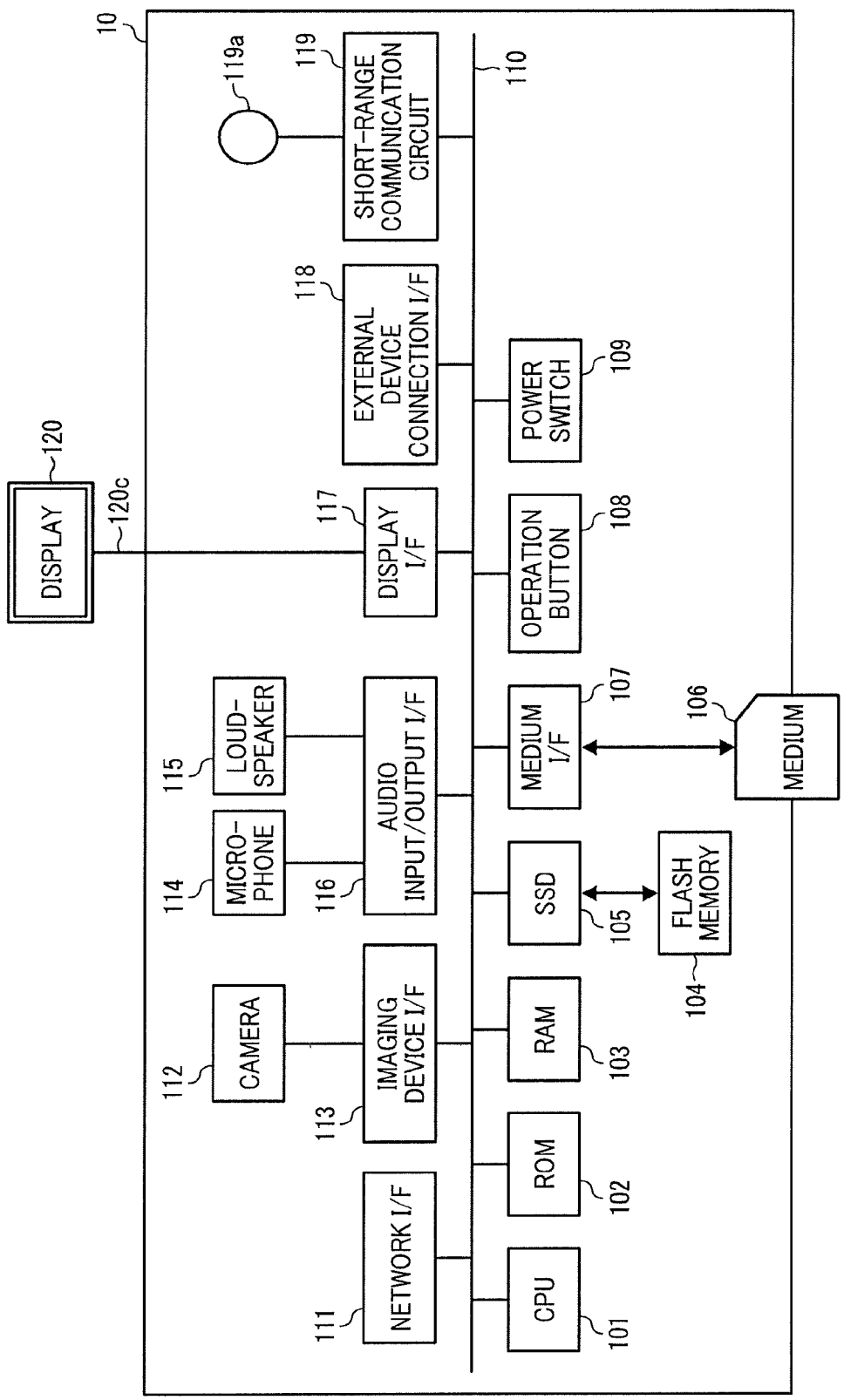
FIG. 2 is a schematic block diagram illustrating a hardware configuration of a video conference terminal according to an embodiment of the present embodiment.

FIG. 2 is a schematic block diagram illustrating the hardware configuration of a video conference terminal according to the present embodiment. As illustrated in FIG. 2, the video conference terminal, which is given as an example of the communication terminal 10 according to the present embodiment, includes a central processing unit (CPU) 101, a read-only memory (ROM) 102, a random access memory (RAM) 103, a flash memory 104, a solid state disk (SSD) 105, a media interface (I/F) 107, an operation key 108, a power switch 109, a bus line 110, a network interface (I/F) 111, a camera 112, an imaging device interface (I/F) 113, a microphone 114, a loudspeaker 115, an audio input and output interface (I/F) 116, a display interface (I/F) 117, an external device connection interface (I/F) 118, a short-range communication circuit 119, and an antenna 119a of the short-range communication circuit 119. The CPU 101 controls the overall operation of the communication terminal 10. The ROM 102 stores a control program used for operating the CPU 101 such as an Initial Program Loader (IPL). The RAM 103 is mainly used as a work area in which the CPU 101 executes a program. The flash memory 104 stores various kinds of data such as a communication control program, image data, and audio data. The SSD 105 controls reading or writing of various kinds of data to or from the flash memory 104 under the control of the CPU 101. As an alternative to the SSD, a hard disk drive (HDD) may be used. The medium interface 107 controls reading or writing of data with respect to a recording medium 106 such as a flash memory. The operation key 108 is operated by a user to input a user instruction such as a user selection of a destination of the communication terminal 10. The power switch 109 turns on or off the power of the communication terminal 10.

The network interface 111 allows communication of data with an external device through a communication network 4 such as the Internet. The camera 112 is an example of imaging device that captures a subject under the control of the CPU 101 to obtain the image data of the subject, and may be incorporated in the communication terminal. The imaging device interface 113 is a circuit that controls the driving of the camera 112. The microphone 114 is an example of a built-in sound collector capable of inputting audio under the control of the CPU 101. The audio input and output interface 116 is a circuit for inputting or outputting an audio signal between the microphone 114 and the loudspeaker 115 under the control of the CPU 101. The display interface 117 is a circuit that sends the image data to an external display 120 according to the control made by the CPU 101. The external device connection interface 118 is an interface circuit that connects the communication terminal 10 to various kinds of external devices. The short-range communication circuit 119 is a communication circuit such as a near-field communication (NFC; Registered Trademark) or Bluetooth (Registered Trademark).

The bus line 110 is, for example, an address bus or a data bus, which electrically connects various elements such as the CPU 101 illustrated in FIG. 2.

The display 120 may be a liquid crystal or organic electroluminescence (EL) display that displays an image of a subject, an operation icon, or the like. The display 120 is connected to the display interface 117 via a cable 120c. The cable 120c may be an analog red green blue (RGB) (video graphic array (VGA)) signal cable, a component video cable, a high-definition multimedia interface (HDMI, registered trademark) signal cable, or a digital video interactive (DVI) signal cable.

The camera 112 includes a lens and a solid-state image sensing device that converts an image (video) of a subject into electronic data by converting light to electric charge. As the solid-state image sensing device, for example, a complementary metal-oxide-semiconductor (CMOS) or a charge-coupled device (CCD) is used. The external device connection interface 118 is capable of connecting an external device such as an external camera, an external microphone, or an external loudspeaker through a Universal Serial Bus (USB) cable or the like. In cases where an external camera is connected, the external camera is driven on a priority basis and the built-in camera 112 is not driven under the control of the CPU 101. In a similar manner to the above, in cases where an external microphone or an external loudspeaker is connected, the external microphone or the external loudspeaker is driven on a priority basis and the built-in microphone 114 or the built-in loudspeaker 115 is not driven under the control of the CPU 101.

The recording medium 106 is removable from the communication terminal 10. In addition, a nonvolatile memory that reads or writes data under the control of the CPU 101 is not limited to the flash memory 104, and an electrically erasable and programmable read-only memory (EEPROM) may be used instead.

<Hardware Configuration of Communication Management System and Relay Device>

Figure 3:
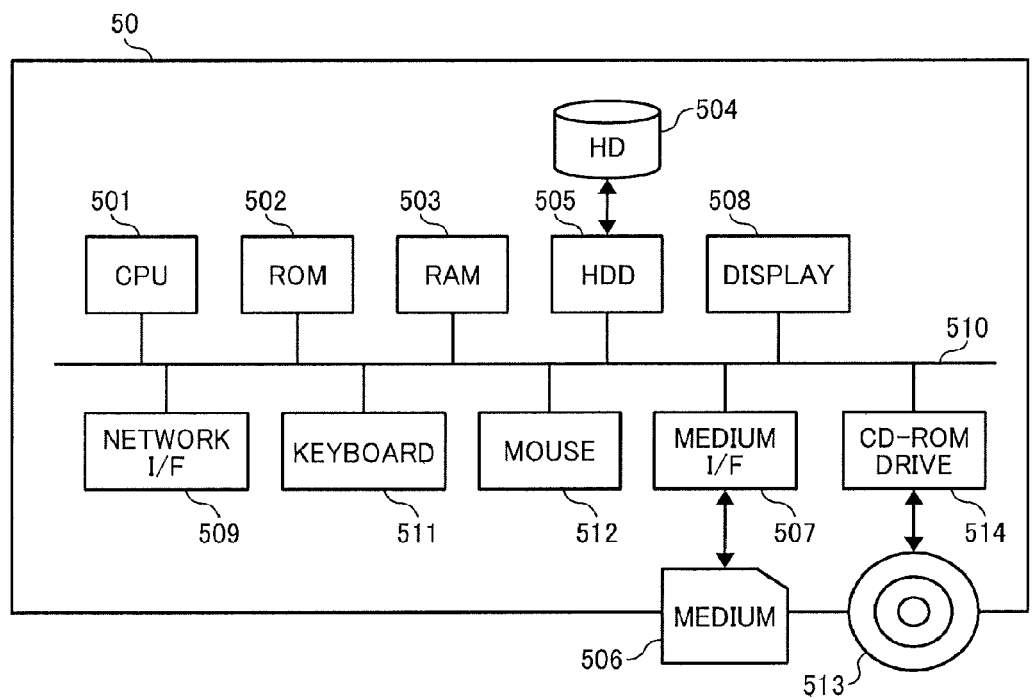
FIG. 3 is a schematic block diagram illustrating a hardware configuration of a communication management system and the relay device according to an embodiment of the present invention.

FIG. 3 is a schematic block diagram illustrating the hardware configuration of the communication management system 50 and the relay device 30 according to the present embodiment. A server computer, which is an example of the communication management system 50, includes a CPU 501, a ROM 502, a RAM 503, a hard disk (HD) 504, a hard disk drive (HDD) 505, a recording medium 506, a medium interface (I/F) 507, a display 508, a network interface (I/F) 509, a keyboard 511, a mouse 512, a compact disc read-only memory (CD-ROM) drive 514, and a bus line 510.

The CPU 501 controls entire operation of the communication management system 50. The ROM 502 stores a control program for controlling the CPU 501 such as an IPL. The RAM 503 is used as a work area for the CPU 501. The HD 504 stores various kinds of data such as the communication management program. The HDD 505 controls reading or writing of various kinds of data to or from the HD 504 under control of the CPU 501. The medium interface 507 controls reading or writing of data with respect to a recording medium 506 such as a flash memory. The display 508 displays various kinds of information such as a cursor, menu, window, characters, or image. The network interface 509 is an interface for communicating data with an external device through the communication network 4 such as the Internet. The keyboard 511 is one example of input device provided with a plurality of keys for allowing a user to input characters, numerical values, or various kinds of instructions. The mouse 512 is one example of input device for selecting or executing various kinds of instructions, selecting an object to be processed, or for moving a cursor. The CD-ROM drive 514 reads or writes various kinds of data with respect to a CD-ROM 513, which is one example of removable recording medium.

The bus line 510 is, for example, an address bus or a data bus, which electrically connects various elements such as the CPU 501 illustrated in FIG. 3.

Note that the hardware configuration of the relay device 30 illustrated in FIG. 1 is similar to that of the communication management system 50, and thus the description of the hardware configuration of the relay device 30 is omitted. However, the relay device 30 stores a relay control program in the HD 504 in alternative to the management program.

<<Hardware Configuration of Electronic Whiteboard>>

Figure 4:
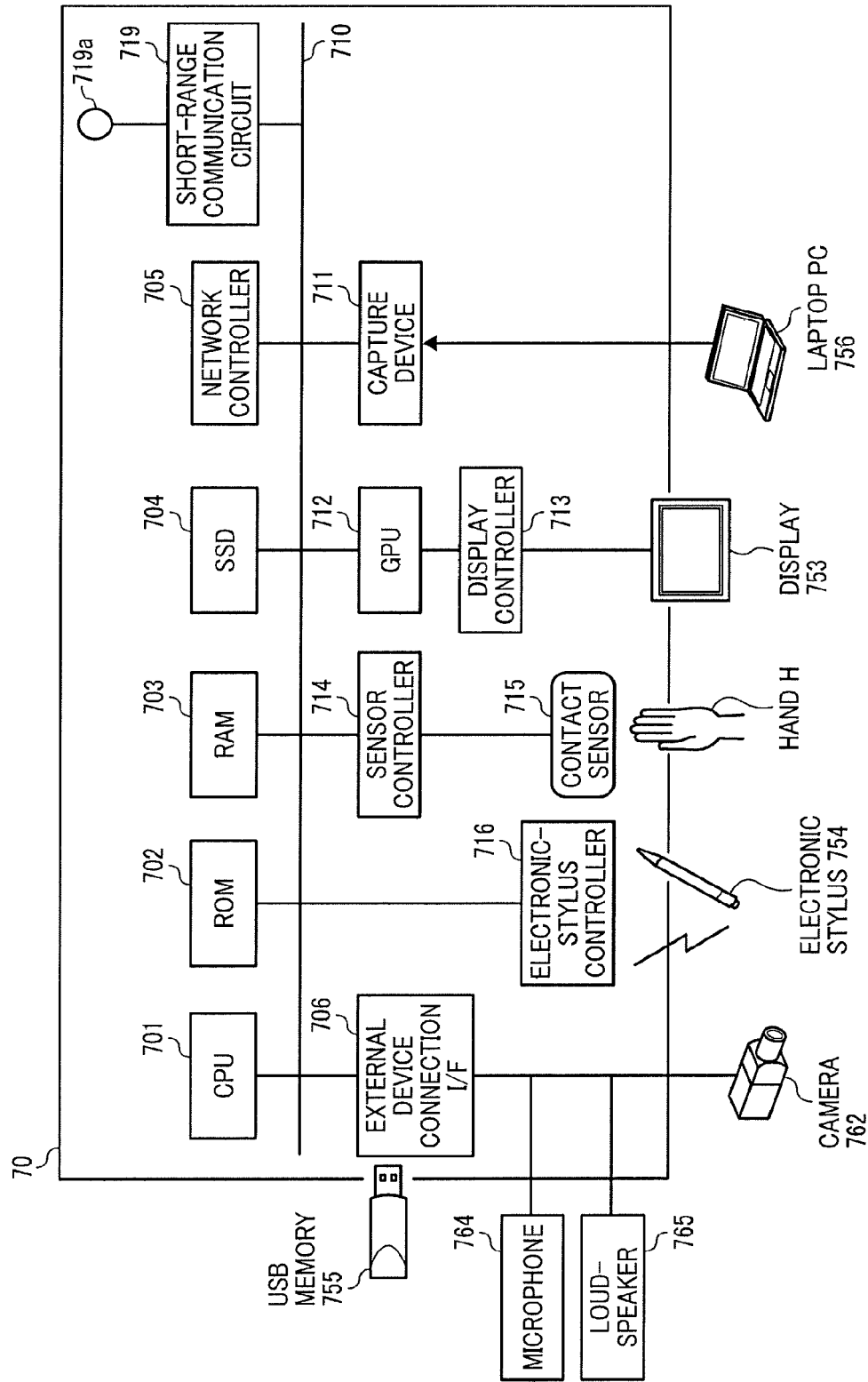
FIG. 4 is a schematic block diagram illustrating a hardware configuration of an electronic whiteboard according to an embodiment of the present invention.

FIG. 4 is a schematic block diagram illustrating the hardware configuration of an electronic whiteboard according to the present embodiment. As illustrated in FIG. 4, the electronic whiteboard, which is as an example of communication terminal 70, includes a CPU 701, a ROM 702, a RAM 703, a SSD 704, a network controller 705, and an external device connection interface (I/F) 706, which are connected through the bus line 710.

The CPU 701 controls entire operation of the electronic whiteboard. The ROM 702 stores a control program for controlling the CPU 701 such as an IPL. The RAM 703 is mainly used as a work area in which the CPU 701 executes a program. The SSD 704 stores various kinds of data such as the control program for the electronic whiteboard. The network controller 705 controls communication with an external device through the communication network 4. The external memory controller 706 controls communication with an external device such as a USB memory 755, and external devices such as a camera 762, a loudspeaker 765, a microphone 764, etc.

The electronic whiteboard (i.e., the communication terminal 70) further includes a capture device 711, a graphics processing unit (GPU) 712, a display controller 713, a sensor controller 714, a contact sensor 715, an electronic stylus controller 716, a short-range communication circuit 719, and an antenna 719a for the short-range communication circuit 719.

The capture device 711 displays the video data on the display of a laptop personal computer (PC) 756 as a still image or moving images. The GPU 712 is a semiconductor chip specializing in processing graphics. The display controller 713 controls the visual display to output the image generated by the GPU 712 to the display 753 or the like. The contact sensor 715 detects a touch onto the display 753 with an electronic stylus 754, a user's hand H, or the like. The sensor controller 714 controls the operation of the contact sensor 715. The contact sensor 715 senses a touch input to a specific coordinate on the display 735 using the infrared blocking system. More specifically, the display 753 is provided with two photoreceptors disposed on both upper side ends of the display 753, and a reflector frame. The photoreceptors emit a plurality of infrared rays in parallel to a touch panel of the display 753. The photoreceptors receive lights passing in the direction that is the same as an optical path of the emitted infrared rays, which are reflected by the reflector frame. The contact sensor 715 outputs an identifier (ID) of the infrared ray that is blocked by an object (such as the user's hand) after being emitted from the light receiving elements, to the sensor controller 714. Based on the ID of the infrared ray, the sensor controller 714 detects a specific coordinate that is touched. The electronic stylus controller 716 communicates with the electronic stylus 754 to detect a touch by the tip or bottom of the electronic stylus 754 to the display 753. The short-range communication circuit 719 is a communication circuit that communicates in compliance with the NFC (Registered Trademark), the Bluetooth (Registered Trademark), or the like.

The bus line 710 is, for example, an address bus or a data bus, which electrically connects various elements such as the CPU 701 illustrated in FIG. 4.

Note that contact sensor 715 is not limited to the infrared blocking system type, but may be a various types of detector, such as a capacitance touch panel that identifies the contact position by detecting a change in capacitance, a resistive membrane touch panel that identifies the contact position by detecting a change in voltage of two resistance films that are opposed to each other, or an electromagnetic induction touch panel that identifies the contact position of an object by detecting electromagnetic induction caused by contact with display. In addition or in alternative to detecting a touch by the tip or bottom of the stylus 754, the electronic stylus controller 716 may also detect a touch by another part of the electronic stylus 754, such as a part held by a hand.

<Hardware Configuration of Smartphone>

Figure 5:
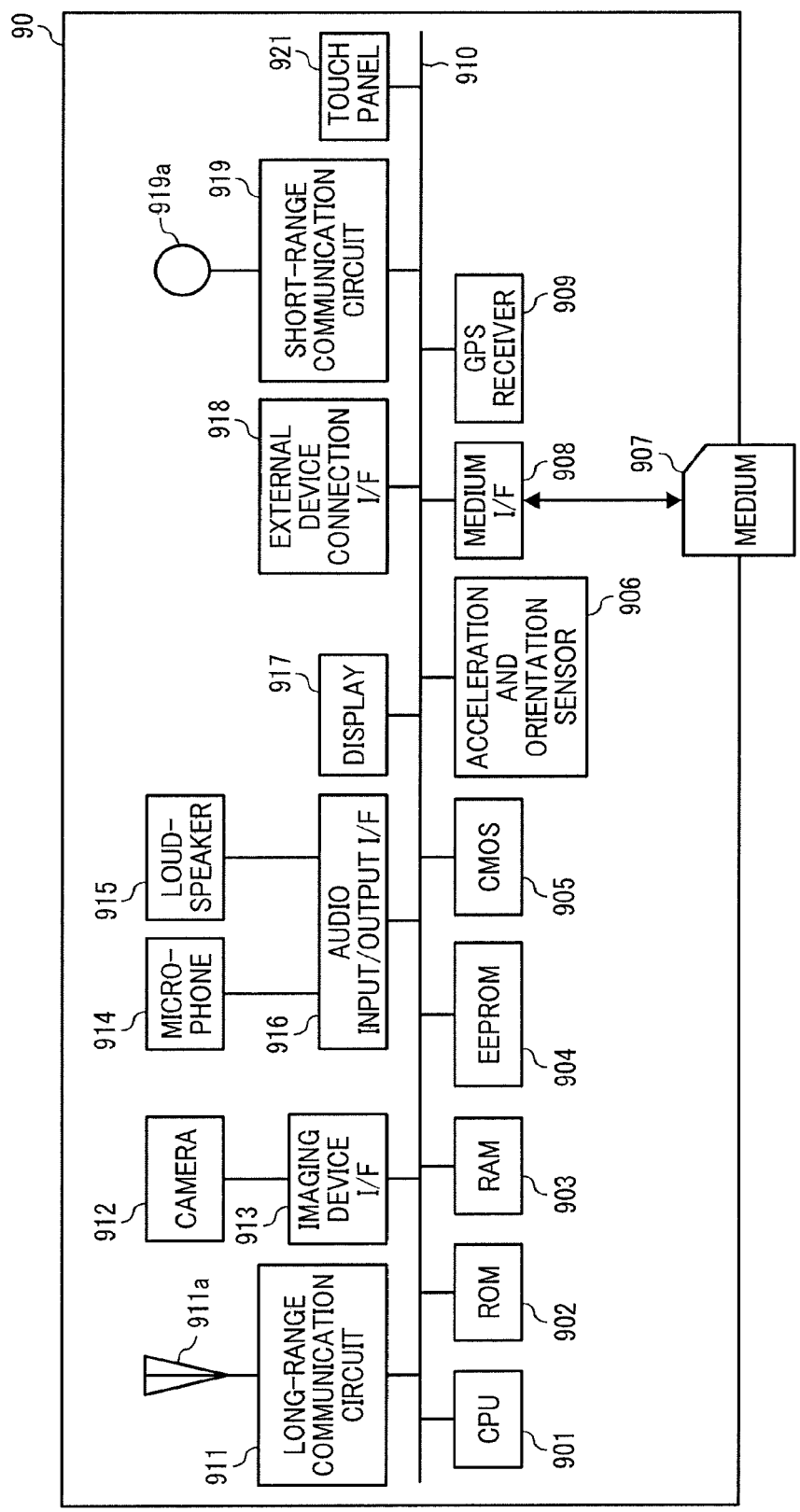
FIG. 5 is a schematic block diagram illustrating a hardware configuration of a smartphone according to the present embodiment.

FIG. 5 is a schematic block diagram illustrating the hardware configuration of a smartphone according to the present embodiment. As illustrated in FIG. 5, a smartphone, which is an example of the mobile station 90, includes a CPU 901, a ROM 902, a RANI 903, an Electrically Erasable and Programmable ROM (EEPROM) 904, a Complementary Metal Oxide Semiconductor (CMOS) sensor 905, an acceleration and orientation sensor 906, a medium I/F 908, and a GPS receiver 909, which are connected through a bus line 910.

The CPU 901 controls the overall operation of the smartphone (i.e., the mobile station 90). The ROM 902 stores a program used for driving the CPU 901, the information processing language (IPL), or the like. The RAM 903 is mainly used as a work area in which the CPU 901 executes a program. The EEPROM 904 reads or writes various kinds of data such as a mobile station control program under control of the CPU 901. The CMOS sensor 905 captures an object under the control of the CPU 901 to obtain captured image data. The acceleration and orientation sensor 906 includes various kinds of sensors such as an electromagnetic compass or gyrocompass for detecting geomagnetism and an acceleration sensor. The medium interface 908 controls reading or writing of data with respect to a recording medium 907 such as a flash memory. The GPS receiver 909 receives a GPS signal from a GPS satellite.

The smartphone further includes a long-range communication circuit 911, a camera 912, an imaging device interface (I/F) 913, a microphone 914, a loudspeaker 915, an audio input and output interface (I/F) 916, a display 917, an external device connection interface (I/F) 918, a short-range communication circuit 919, an antenna 919a of the short-range communication circuit 919, and a touch panel 921.

The long-range communication circuit 911 is a circuit that communicates with the other device through a communication network 2 such as the mobile communication network. The camera 912 is an example of a built-in imaging device that captures a subject under the control of the CPU 901 to obtain image data. The imaging device interface 913 is a circuit that controls the driving of the camera 912. The microphone 914 is an example of a built-in sound collector capable of inputting audio under the control of the CPU 901.

The audio input and output interface 916 is a circuit for inputting or outputting an audio signal between the microphone 914 and the loudspeaker 915 under the control of the CPU 901. The display 917 may be a liquid crystal or organic electro luminescence (EL) display that displays an image of a subject, various kinds of icons, or the like. The external device connection interface 918 is an interface circuit that connects the communication terminal 90 to various kinds of external devices. The short-range communication circuit 919 is a communication circuit that communicates in compliance with the NFC (Registered Trademark), the Bluetooth (Registered Trademark), and the like. The touch panel 921 is an example of an input device to operate a smartphone by touching the screen of the display 917.

The bus line 910 is, for example, an address bus or a data bus, which electrically connects various elements such as the CPU 901 illustrated in FIG. 5.

The mobile station 90 is not limited to a smartphone, but may be implemented, for example, by a tablet PC, a smart watch, a mobile phone, and a portable game machine.

Further, the above-described control program is a file in an installable format or executable format, and may be recorded on a computer-readable recording medium for distribution. Examples of the recording medium include, but not limited to, Compact Disc Recordable (CD-R), Digital Versatile Disc (DVD), Blu-ray disc, and SD card.

<<Schematic Configuration of Communication System>>

Figure 6:
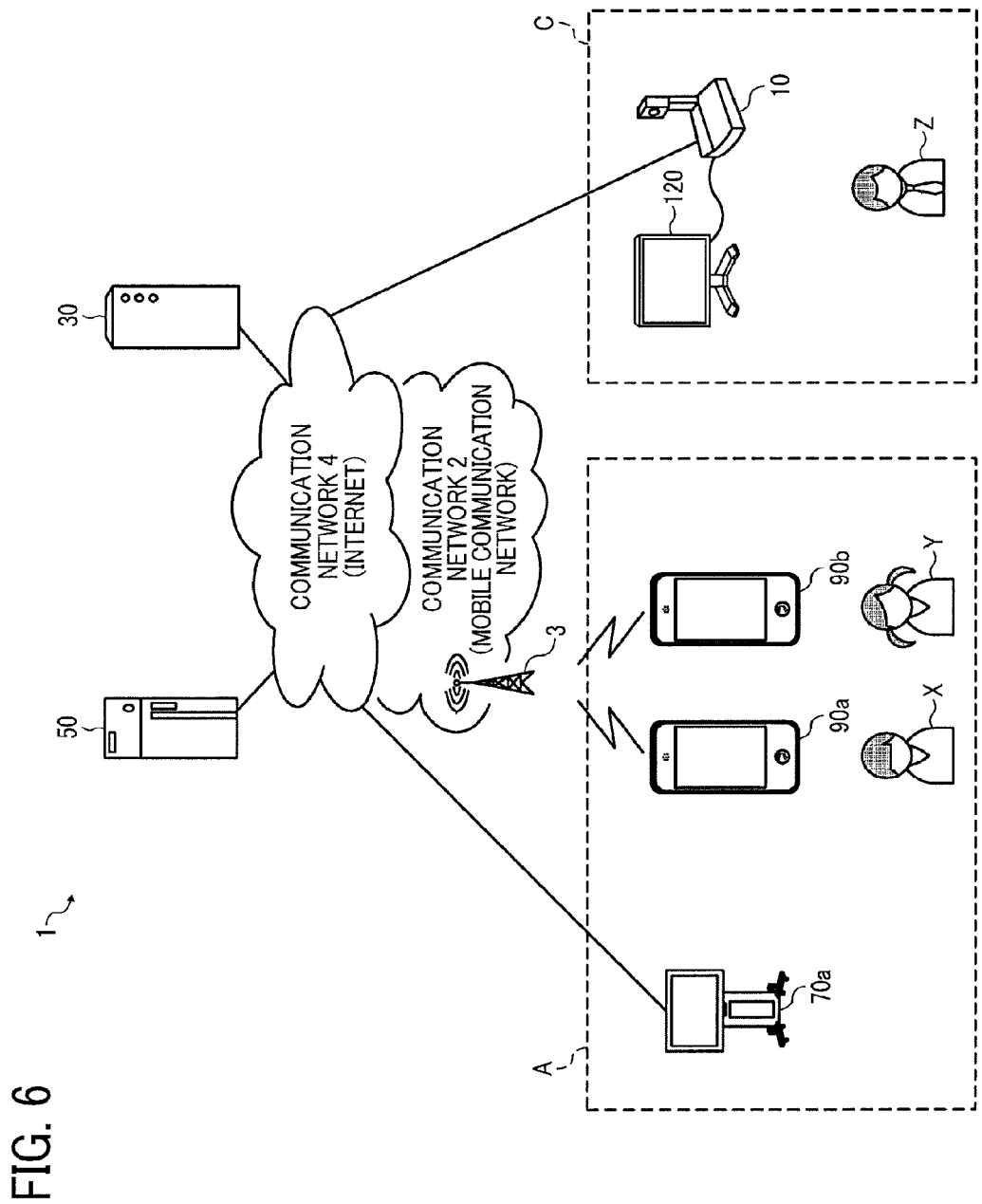
FIG. 6 is a diagram illustrating a schematic network configuration of the communication system of FIG. 1.

Next, the schematic configuration of a communication system according to the present embodiment is described with reference to FIG. 6. FIG. 6 is a diagram illustrating a schematic configuration of a communication system according to the present embodiment of the present invention.

In FIG. 6, a communication terminal 70a, a mobile station 90a, and a mobile station 90b are used at a site A, and the communication terminal 10 is used at a site C. For example, it is assumed that the base A and the base C are Japan and the U.S., respectively. The communication terminal 70a is used as a shared communication terminal for a user X and a user Y, and is basically installed in the site A. Hereinafter, the communication terminal 70a may be referred to as a shared communication terminal.

The mobile station 90a is an example of the mobile station 90, and is personalized to the user X. Moreover, the mobile station 90b is an example of the mobile station 90, and is personalized to the user Y. On the other hand, the communication terminal 10 is used as a shared communication terminal for a user Z, and is basically installed in the site C. Hereinafter, the communication terminal 10 may also be referred to as a shared communication terminal.

The mobile station 90a and the mobile station 90b can perform video communication to exchange data with the communication terminal 70a or the communication terminal 10 via a base station 3, a communication network 2 such as a mobile communication network, and a communication network 4 including the Internet.

The communication terminal 70a, the relay device 30, the communication management system 50, and the communication terminal 10 can perform video communication to exchange data with each other via the communication network 4. Note also that the communication networks 2 and 4 may each include a wireless network.

<<Functional Configuration of Embodiment>>

Figure 7:
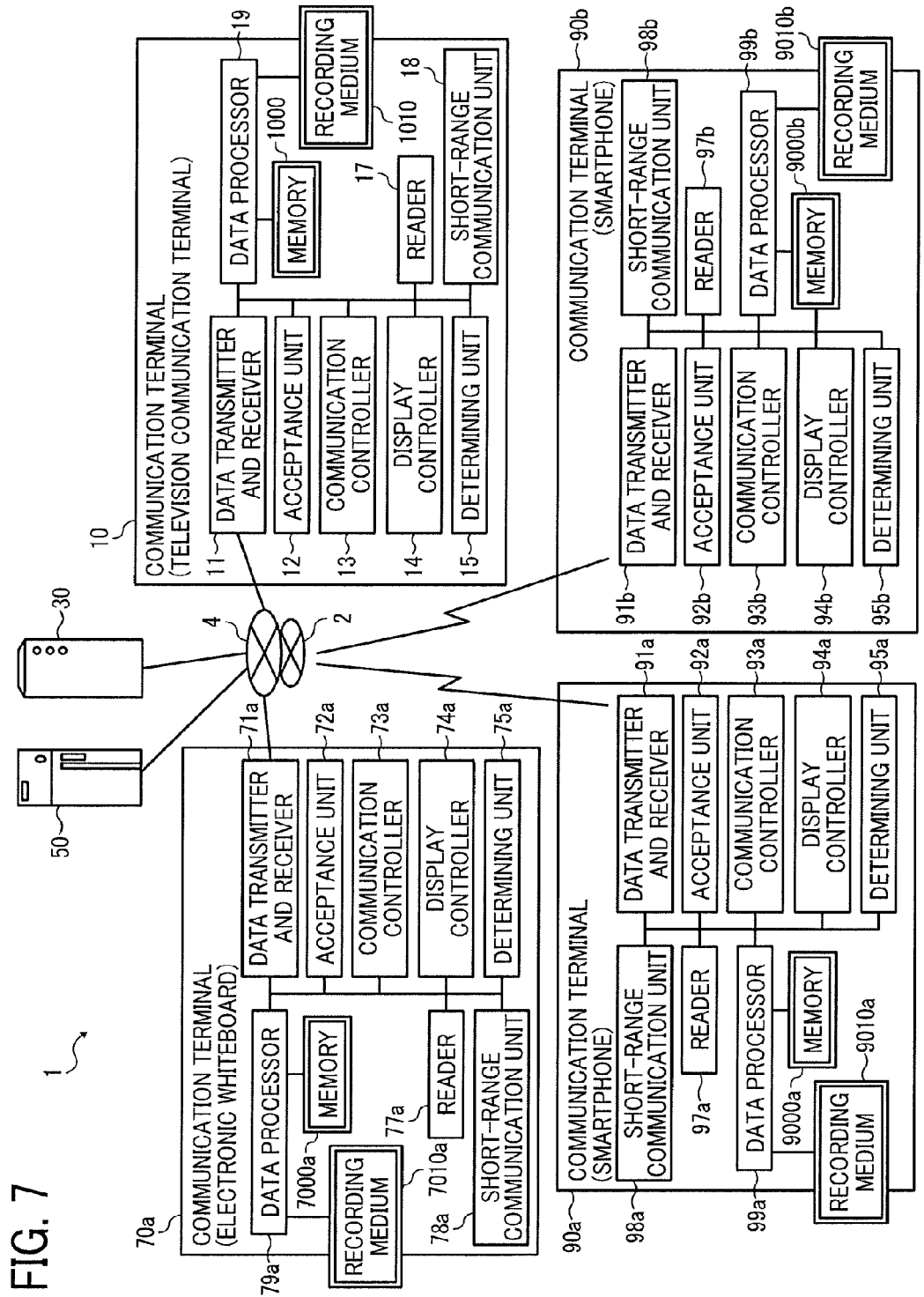
FIG. 7 is a functional block diagram of a communication system according to an embodiment of the present invention.
Figure 8:
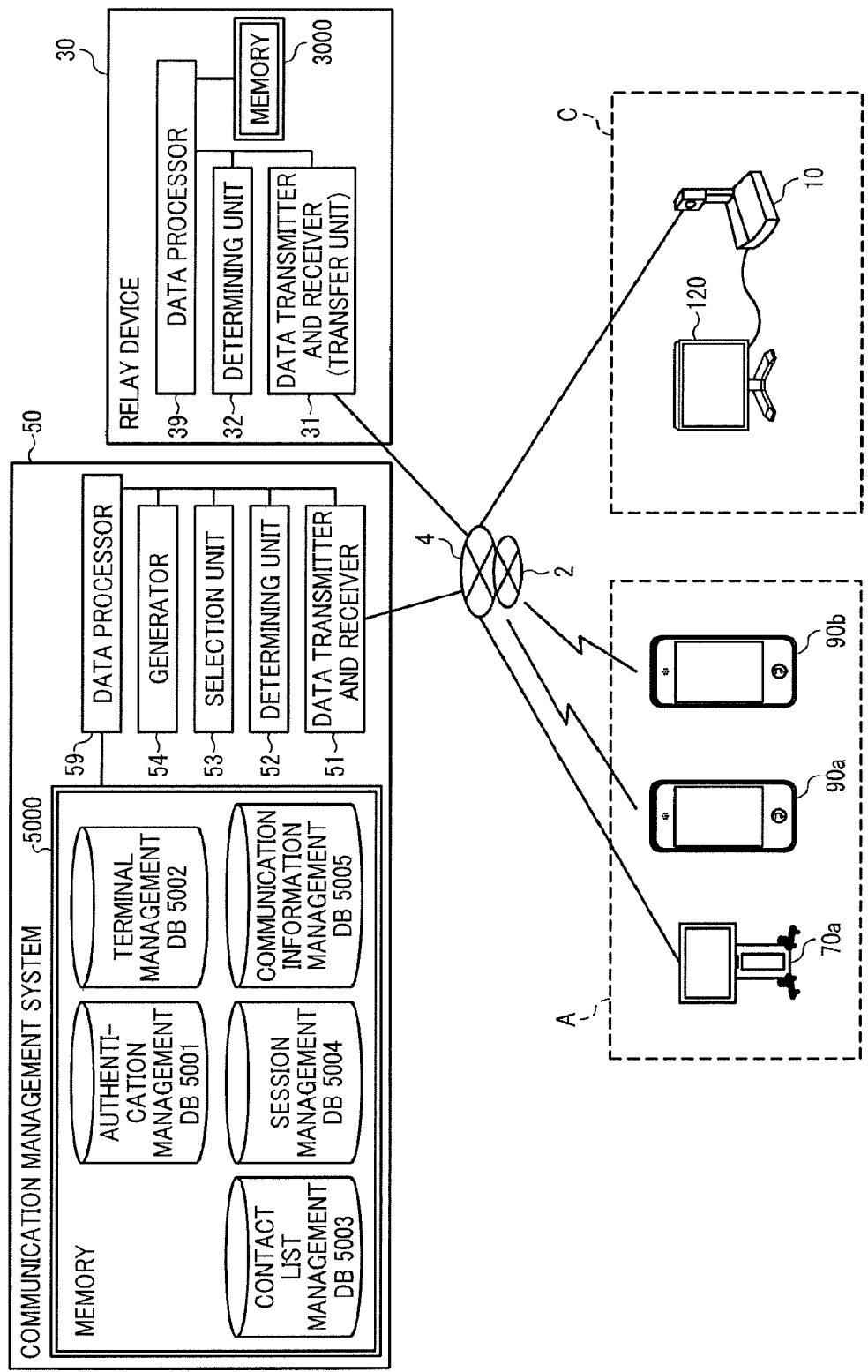
FIG. 8 is a functional block diagram of a communication system according to an embodiment of the present invention.

Next, the functional configuration according to the present embodiment is described with reference to FIG. 2 to FIG. 5, FIG. 7, and FIG. 8. FIG. 7 and FIG. 8 are functional block diagrams of the communication system according to the present embodiment.

<Functional Configuration of Communication Terminal 10>

As illustrated in FIG. 7, the communication terminal 10 includes a data transmitter and receiver 11, an acceptance unit 12, a communication controller 13, a display controller 14, a determining unit 15, a reader 17, a short-range communication unit 18, and a data processor 19. These units are functions that are implemented by or that are caused to function by operating any of the hardware components illustrated in FIG. 2 in cooperation with the instructions of the CPU 101 according to the communication control program expanded from the flash memory 104 to the RAM 103. The communication terminal 10 further includes a memory 1000 configured by the RAM 103 illustrated in FIG. 2, and the flash memory 104 illustrated in FIG. 2.

<Detailed Functional Configuration of Communication Terminal 10>

Next, the components of the communication terminal 10 are described. The data transmitter and receiver 11 is implemented by the instructions from the CPU 101, the network interface 111, and the external device connection interface 118, each of which is illustrated in FIG. 2, and transmits or receives various kinds of data (or information) to or from the other terminal, apparatus, or system, through the communication network 4. Before starting communication with an external communication terminal, the data transmitter and receiver 11 starts receiving terminal status information indicating the operating status of each communication terminal as a candidate counterpart terminal, from the communication management system 50. The status information does not only indicate the operating status of each communication terminal (whether the communication terminal is in an online or offline (disconnected) state), but also indicates a detailed state such as whether an online communication terminal can actually be reached, whether the online communication terminal is currently communicating with another terminal, and whether the user of the online communication terminal is temporarily absent. Hereinafter, the case in which the status information indicates the operating status is described by way of example.

The acceptance unit 12 is substantially implemented by the instructions from the CPU 101, the operation key 108, and the power switch 109, each of which is illustrated in FIG. 2, and receives various kinds of inputs.

The communication controller 13 is implemented by the instructions of the CPU 101, and any desired device relating to input or output of contents of data. In one example, the communication control 13 is implemented by the instructions of the CPU 101 illustrated in FIG. 1 and by the camera 112 and the imaging device interface 113 illustrated in FIG. 1. The communication control 13 captures an image of a subject and outputs image data obtained by capturing the image. In one example, the communication controller 13 is implemented by the instructions of the CPU 101 illustrated in FIG. 2 and by the audio input and output interface 116 illustrated in FIG. 2. After the sound of the user is converted to an audio signal by the microphone 114, the communication controller 13 receives audio data according to this audio signal. Further, the communication controller 13 is implemented by the instructions of the CPU 101 illustrated in FIG. 2 and by the audio input and output interface 116 illustrated in FIG. 2, and outputs the audio signal according to the audio data to the loudspeaker 115, and the loudspeaker 115 outputs audio.

The display control 14 is substantially implemented by the instructions of the CPU 101 illustrated in FIG. 2 and by the display interface 117 illustrated in FIG. 2. The display control 14 combines received images of different resolutions and transmits the combined image to the display 120. The display control 14 may also transmit contact list information received from the communication management system 50 to the display 120, to control the display 120 to the contact list thereon.

The reader 17 is substantially implemented by the instructions from the CPU 101, and any desired device relating to input or output of contents of data. In one example, the reader 17 is implemented by the instructions from the CPU 101, the camera 112, and the imaging device interface 113, each of which is illustrated in FIG. 2, and reads a bar code such as a Quick Response (QR) code (registered trademark) to obtain the data indicated by the bar code.

The short-range communication unit 18 is substantially implemented by the instructions from the CPU 101 and the short-range communication circuit 119 with the antenna 119*a* illustrated in FIG. 2, and exchanges data by short-range radio communication with a communication terminal for which a short-range communication unit is provided.

The data processor 19 is substantially implemented by the instructions from the CPU 101 and the SSD 105 illustrated in FIG. 2, and stores various kinds of data in the memory 1000 or the recording medium 1010 or to read various kinds of data stored in the memory 1000 or the recording medium 1010.

Further, every time image data and audio data are received in performing communication with another counterpart terminal, the received image data and audio data are overwritten and stored in the memory 1000. The display 120 displays an image based on image data before being overwritten, and the loudspeaker 115 outputs audio based on audio data before being overwritten. The recording medium 1010 is implemented by the USB recording medium 106 illustrated in FIG. 2.

Note that terminal ID in the present embodiment is an example of terminal identification information that is used to uniquely identify the communication terminal 10. Such terminal identification information includes a language, a character, a symbol, or various kinds of marks. For example, a combination of at least two of the above-mentioned language, characters, symbols, and various kinds of marks may be used as terminal ID. Instead of terminal ID, a user ID for identifying the user at the communication terminal 10 may be used. In such cases, terminal identification information includes not only the terminal ID but also the user ID. The user ID may include the national identification numbers (so-called "my number" in Japan) in the Japanese national identification number system.

<Functional Configuration of Relay Device>

As illustrated in FIG. 8, the relay device 30 includes a data transmitter and receiver 31 that also serves as a transfer unit, a determining unit 32, and a data processor 39. These units are functions that are implemented by or that are caused to function by operating any of the elements illustrated in FIG. 3 in cooperation with the instructions of the CPU 501 according to the relay device control program expanded from the HD 504 to the RAM 503. The relay device 30 also includes a memory 3000 implemented by the RAM 503 illustrated in FIG. 3 and/or the HD 504 illustrated in FIG. 3.

<Detailed Functional Configuration of Relay Device>

Next, the functional configuration of the relay device 30 is described in detail. In the following description of the functional configuration of the relay device 30, the relation of the hardware elements in FIG. 3 with the functional configuration of the relay device 30 depicted in FIG. 8 will also be described.

The data transmitter and receiver 31 of the relay device 30 illustrated in FIG. 8 is implemented by the instructions from the CPU 501 illustrated in FIG. 3 and by the network interface 509 illustrated in FIG. 3, and transmits or receives various kinds of data (or information) to or from another terminal, device, or system, via the communication network 4. The data transmitter and receiver 31 may also serve as a transferor to transfer the image data and audio data transmitted from a prescribed communication terminal (such as the communication terminal 10) to another communication terminal (such as the communication terminal 70).

The determining unit 32 is implemented by the instructions from the CPU 501 illustrated in FIG. 3, and determines delay of data transmission or the like.

The data processor 39 is implemented by the instructions from the CPU 501 illustrated in FIG. 3 and the HDD 505 illustrated in FIG. 3, and stores various kinds of data in the memory 3000 or read various kinds of data stored in the memory 3000.

<Functional Configuration of Communication Management System>

As illustrated in FIG. 8, the communication management system 50 includes a data transmitter and receiver 51, a determining unit 52, a selection unit 53, a generator 54, and a data processor 59. These units are functions that are implemented by or that are caused to function by operating any of the elements illustrated in FIG. 8 in cooperation with the instructions of the CPU 501 according to the communication management program expanded from the HD 504 to the RAM 503. The communication management system 50 also includes a memory 5000 that is configured by the HD 504 illustrated in FIG. 3.

<Authentication Management Table>

FIG. 9 is a diagram illustrating an authentication management table according to the present embodiment. In the memory 5000, as illustrated in FIG. 9, an authentication management database (DB) 5001 that is made of an authentication management table is stored. The authentication management table stores, for each one of the communication terminals 10, 70, and 90 managed by the communication management system 50, the terminal ID and the password in association with each other. For example, the authentication management table illustrated in FIG. 9 indicates that the terminal ID of the terminal 70*a*, which is a kind of the communication terminal 70, is "01aa", and the password of the terminal 70*a* is "aaaa". Such a password is an example of authentication data, and the authentication data may include an access token.

<Terminal Management Table>

FIG. 10 is a diagram illustrating a terminal management table according to the present embodiment. In the memory 5000, as illustrated in FIG. 10, a terminal management database (DB) 5002 that is made of a terminal management table is stored. The terminal management table stores, for the terminal ID of each one of the terminals (such as the communication terminals 10, 70*a*, 90*a*, and 90*b*) managed by the communication management system 50, the name of destination address when each of the communication terminals 10, 70*a*, 90*a*, and 90*b* serves as a counterpart terminal, the operating status of the communication terminals 10, 70*a*, 90*a*, and 90*b*, the date and time when a login request, as will be described later, is received at the communication management system 50, and the IP address of each of the communication terminals 10, 70*a*, 90*a*, and 90*b*, in association with one another. For example, the terminal management table illustrated in FIG. 10 indicates that the terminal 70*a* with the terminal ID "01aa" has the terminal name "AA terminal, Tokyo office, Japan", the operating status "online (communicating)", the date and time received at which a login request is received by the communication management system 50 "Apr. 10, 2015, 13:40", and the IP address "1.2.1.3". Note that the terminal ID, the name of destination address, and the terminal IP address in the terminal management table as depicted in FIG. 10 are stored in the communication management system 50 when the communication management system 50 accepts registration of each of the communication terminals 10, 70a, 90a, and 90b that requests services from the communication management system 50.

<Contact List Management Table>

FIG. 11 is a diagram illustrating a contact list management table according to the present embodiment. In the memory 5000, as illustrated in FIG. 11, a contact list management database (DB) 5003 that is made of a contact list management table is stored. In the contact list management table, the terminal ID of starting terminals that request the startup of communication is all associated with the terminal ID of counterpart terminals registered as candidates for counterpart terminals, and is managed. For example, the contact list management table illustrated in FIG. 11 indicates that candidate counterparts to which a starting terminal (communication terminal 70a) whose terminal ID is "01aa" can send a request to start communication in a video conference are, for example, the communication terminal 90a whose terminal ID is "01ab", a communication terminal 10ba whose terminal ID is "01ba", a communication terminal 10bb whose terminal ID is "01bb", and the communication terminal 10 whose terminal ID is "01ca". The candidate counterpart terminals are updated by addition or deletion in response to an adding or deleting request received from any request sender terminal (starting terminal) to the communication management system 50.

The contact list is just one example of contact information indicating a candidate of counterpart communication terminals, such that the contact information may be managed in various ways other than in the form of contact list, as long as the counterpart terminal information such as terminal ID of a candidate counterpart is associated with the starting terminal.

<Session Management Table>

FIG. 12 is a diagram illustrating a session management table according to the present embodiment. In the memory 5000, as illustrated in FIG. 12, a session management database (DB) 5004 that is made of a session management table is stored. In the session management table, the relay device ID of the relay device 30 to be used, the terminal ID of a starting terminal, the terminal ID of a counterpart terminal, the delay time (millisecond (ms)) in reception when image data is received by the counterpart terminal, and date and time when the delay information indicating the delay time is sent from the counterpart terminal and is received at the communication management system 50 are associated with each communication session ID that identifies the session of video communication between a communication terminal and relay device 30. For example, the session management table illustrated in FIG. 12 indicates that the session is performed using the session ID "se01", the relay device (with the relay device ID "111a") relays image data and audio data between the starting terminal (i.e., the communication terminal 70a) with the terminal ID "01aa" and the counterpart terminal (i.e., the communication terminal 10) with the terminal ID "01ca", and that the delay time of the image data at the counterpart terminal (terminal 10db) at "13:41, Apr. 10, 2015" is 200 ms.

<Communication Information Management Table>

FIG. 13 is a diagram illustrating a communication information management table according to the present embodiment. In the memory 5000, as illustrated in FIG. 13, a communication information management database (DB) 5005 that is made of a communication information management table is stored. In the communication information management table, the terminal ID of a shared communication terminal and the terminal ID of personal communication terminals are each associated with communication ID that identifies the video communication performed between the communication terminals and the relay device 30. Note that the shared communication terminal performs video communication, and the personal communication terminals are owned by users who use the shared communication terminal to perform a conversation or the like. Note that the communication ID is an example of communication identification information. When conference is held among a plurality of terminals, the communication ID indicates conference ID that identifies the conference. For example, the communication information management table depicted in FIG. 13 indicates that the shared communication terminal at the site A (i.e., the communication terminal 70a) performs video communication with the shared communication terminal at the site C (i.e., the communication terminal 10), for a conference or the like, in the video communication indicated by the communication ID "co01" Further, the communication information management table depicted in FIG. 13 indicates that a user X, who is the owner of the personal communication terminal with the terminal ID "01ab" (i.e., the mobile station 90a), and a user Y, who is the owner of the personal communication terminal with the terminal ID "01ac" (i.e., the mobile station 90b), are participating in a conference or the like at the site A.

<Detailed Functional Configuration of Communication Management System>

Next, the functional configuration of the communication management system 50 is described in detail. In the following description of the functional configuration of the communication management system 50, relation of the hardware configuration of FIG. 3 with functional configuration of the communication management system 50 in FIG. 8 will also be described.

The data transmitter and receiver 51 of the communication management system 50 illustrated in FIG. 8 is implemented by the instructions of the CPU 501 illustrated in FIG. 3 and by the network interface 509 illustrated in FIG. 3, and transmits or receives various types of data (or information) to or from another terminal, device, or system via the communication network 4.

The determining unit 52 is implemented by the instructions from the CPU 501 illustrated in FIG. 3, and makes various kinds of determination.

The selection unit 53 is implemented by the instructions from the CPU 501 illustrated in FIG. 3, and selects, based on the IP address of each of the communication terminals participating in a communication session, a relay device suited to video communication among terminals through the communication session.

The generator 54 is implemented by the instructions from the CPU 501 illustrated in FIG. 3, and generates communication ID according to the request to start video communication sent from a communication terminal.

The data processor 59 is implemented by the instructions from the CPU 501 illustrated in FIG. 3 and the HDD 505 illustrated in FIG. 3, and stores various kinds of data in the memory 5000 or read various kinds of data stored in the memory 5000.

<Functional Configuration of Communication Terminal 70a>

As illustrated in FIG. 7, the communication terminal 70a includes a data transmitter and receiver 71a, an acceptance unit 72a, a communication controller 73a, a display controller 74a, a determining unit 75a, a reader 77a, a short-range communication unit 78a, and a data processor 79a. These units are functions that are implemented by or that are caused to function by operating any of the elements illustrated in FIG. 4 in cooperation with the instructions of the CPU 701 according to the communication control program expanded from the SSD 704 to the RAM 703. The communication terminal 70a further includes a memory 7000a that is configured by the RAM 703 and the SSD 704 illustrated in FIG. 4.

<Detailed Functional Configuration of Communication Terminal 70a>

Next, the components of the communication terminal 70a are described. The data transmitter and receiver 71a is implemented by the instructions from the CPU 701, the network controller 705, and the external device connection interface 706, each of which is illustrated in FIG. 4, and exchanges various kinds of data (or information) with another communication terminal, apparatus, or system through the communication network 4. Before starting communication with other communication terminals 10, 70d, and 90a, the data transmitter and receiver 71a starts receiving terminal status information indicating the operating status of the communication terminals 10, 70d, and 90a as candidate counterparts, from the communication management system 50. The status information does not only indicates the operating status of the communication terminals 10, 70a, and 90a (whether each of the communication terminals is in an online or offline state), but also indicates a detailed state such as whether an online communication terminal can actually be reached, whether the online communication terminal is currently communicating with another terminal, and whether the user of the online communication terminal is temporarily absent. In addition, the status information not only indicates the operating status of each terminal, but also indicates various kinds of status, such as the state that the cable 120c is disconnected from the communication terminal 10, the state that some of the communication terminals 10, 70d, and 90a can output sounds but not images, or the state that some of the communication terminals 10, 70d, and 90a is muted. Hereinafter, the case in which the status information indicates the operating status is described by way of example.

Further, the data transmitter and receiver 71a may also serve as a starting unit and starts communication with another communication terminal such as the communication terminal 10.

The acceptance unit 72a is substantially implemented by the instructions from the CPU 701, the contact sensor 715, and the electronic stylus controller 716, each of which is illustrated in FIG. 4, and accepts various kinds of inputs.

The communication controller 73a obtains drawing data that is drawn on the display 753 using the electronic stylus 554 or the hand H, and converts the drawing data into coordinate data that serves as stroke data. Further, when the communication terminal 70a transmits the drawing data to the communication terminal 70d, for example, the communication terminal 70d controls the display 753 of the communication terminal (electronic whiteboard) 70d to display the same drawing based on the drawing data received from the communication terminal 70a.

The communication controller 73a is substantially implemented by the instructions from the CPU 701 illustrated in FIG. 4, in cooperation with any desired device relating to input or output of contents of data. In one example, the communication controller 13 performs image processing on an image captured by the camera 762. The communication controller 73 is implemented by the instructions from the CPU 701, and after the audio of the user is converted to an audio signal by the microphone 764, the communication controller 73 processes audio databased on this audio signal. Further, the communication controller 73 may be implemented by the instructions from the CPU 701 illustrated in FIG. 4, and outputs the audio signal according to the audio data to the loudspeaker 765 such that the loudspeaker 765 outputs a sound.

The display control 74a is substantially implemented by the instructions of the CPU 701 illustrated in FIG. 4 and by the display controller 713 illustrated in FIG. 4. The display control 74 combines the received image data of different resolutions and transmits the combined image data to the display 753. The display control 74a may also transmit information on a contact list, received from the communication management system 50, to the display 753, and control display of the contact list on the display 753.

The determining unit 75a is substantially implemented by the instructions from the CPU 701 illustrated in FIG. 4, and determines whether any other communication terminal including a short-range communication unit is within a predetermined distance from the communication terminal 70a.

The reader 77a is substantially implemented by the instructions from the CPU 701, the camera 762, and the external device connection interface 706, each of which is illustrated in FIG. 4, and reads a bar code such as a Quick Response (QR) code to obtain the data indicated by the bar code.

The short-range communication unit 78a is substantially implemented by the instructions from the CPU 701 and the short-range communication circuit 719 provided with the antenna 719a, each of which is illustrated in FIG. 4, and communicates with the mobile station 90 to exchange data by short-range radio communication.

The data processor 79a is substantially implemented by the instructions from the CPU 701 and the SSD 704 illustrated in FIG. 4. The data processor 79a stores various types of data in the memory 7000a or the recording medium 7010a or reads various types of data from the memory 7000a or the recording medium 7010a.

Further, every time image data and audio data are received in performing communication with another communication terminal, the memory 7000a overwrites the image data and audio data. The display 753 displays an image based on image data before being overwritten, and the loudspeaker 765 outputs audio based on audio data before being overwritten. The recording medium 7010a is implemented by the USB memory 755 that is illustrated in FIG. 4.

<Functional Configuration of Mobile Station 90a>

As illustrated in FIG. 7, the mobile station 90a includes a data transmitter and receiver 91a, an acceptance unit 92a, a communication controller 93a, a display controller 94a, a determining unit 95a, a reader 97a, a short-range communication unit 98a, and a data processor 99a. These units are functions that are implemented by or that are caused to function by operating any of the hardware elements illustrated in FIG. 5 in cooperation with the instructions of the CPU 901 according to the communication control program expanded from the EEPROM 904 to the RAM 903. The communication terminal 90 further includes a memory 9000*a* configured by the RAM 903 illustrated in FIG. 5 and the EEPROM 904 illustrated in FIG. 5.

<Detailed Functional Configuration of Mobile Station 90*a*>

Next, the components of the mobile station 90*a* are described. The data transmitter and receiver 91*a* is substantially implemented by the instructions from the CPU 901 and the long-range communication circuit 911 with the antenna 911*a*, each of which is illustrated in FIG. 5. The data transmitter and receiver 91*a* exchanges various types of data, such as communication data, with another communication terminal, apparatus, or system through the communication network 2.

The acceptance unit 92*a* is substantially implemented by the instructions of the CPU 901 illustrated in FIG. 5 and by the touch panel 921 illustrated in FIG. 5, and receives various kinds of inputs from the user.

The communication controller 93*a* is implemented by the instructions from the CPU 901 illustrated in FIG. 5 in cooperation with any desired device relating to input or output of contents of data. In one example, the communication controller 93*a* is substantially implemented by the instructions from the CPU 901 in cooperation with the imaging device interface 913, and applies image processing to an image captured by the camera 912. In another example, the communication controller 93*a* may be implemented by the instructions from the CPU 901 in cooperation with the audio input and output interface 916. After the voice of a user is converted into an audio signal by the microphone 914, the communication controller 93*a* processes the audio data of the obtained audio signal. In another example, the communication controller 93*a* may be implemented by the instructions from the CPU 901 and the audio input and output interface 916, each of which is illustrated in FIG. 5. In this example, the communication controller 93*a* outputs the audio signal based on the audio data to the loudspeaker 915, and the loudspeaker 915 outputs the sound.

The display control 94*a* is substantially implemented by the instructions from the CPU 901 illustrated in FIG. 5, and controls the display 917 to display the image data thereon.

The determining unit 95*a* is substantially implemented by the instructions from the CPU 901 illustrated in FIG. 5, and outputs a determination result as will be described later.

The reader 97*a* is substantially implemented by the instructions from the CPU 901, the camera 912, and the imaging device interface 913, each of which is illustrated in FIG. 5, and reads a bar code such as a Quick Response (QR) code to obtain the data indicated by the bar code.

The short-range communication unit 98*a* is substantially implemented by the instructions from the CPU 901 and the short-range communication circuit 919 provided with the antenna 919*a*, each of which is illustrated in FIG. 5. The short-range communication unit 98*a* communicates with another communication terminal to exchange data by short-range radio communication.

The data processor 99*a* is substantially implemented by the instructions from the CPU 901 and the EEPROM 904, each of which is illustrated in FIG. 5. The data processor 99*a* stores various types of data in the memory 9000*a* or read various types of data from the memory 9000*a*.

<Functional Configuration of Communication Terminal 90*b*>

As illustrated in FIG. 7, the communication terminal 90*b* includes a data transmitter and receiver 91*b*, an acceptance unit 92*b*, a communication controller 93*b*, a display controller 94*b*, a determining unit 95*b*, a reader 97*b*, a short-range communication unit 98*b*, and a data processor 99*b*. As these components of the communication terminal 90*b* have the functions equivalent to those of the data transmitter and receiver 91*a*, the acceptance unit 92*a*, the communication controller 93*a*, the display controller 94*a*, the determining unit 95*a*, the reader 97*a*, the short-range communication unit 98*a*, and the data processor 99*a* of the mobile station 90*a*, respectively, the description is omitted.

<<Operation>>

Next, the operation of the communication system 1 according to the present embodiment is described with reference to FIG. 6, FIG. 14A to FIG. 19B. Firstly, the situation according to the present embodiment is briefly described with reference to FIG. 6. As the communication terminal 10 that serves as a video conference terminal is installed in the site C, the user X at the site A can visually recognize the figure of the user Z at the site C. Thus, the user X can easily figure out that the user Z is participating in a conference or the like. On the other hand, as the communication terminal 70*a* that serves as an electronic whiteboard is installed in the site A, the user Z at the site C can view the drawings drawn by the user X at the site A but cannot view the figure of the user X. If the user Z wishes to view the figure of the user X, the window for the drawings has to be switched to the window of a subject (user X). For this reason, if many participants join at the site A, it becomes difficult for the user Z at the site C to get an idea of who is participating at the site A. Moreover, it becomes difficult to distribute the data of certain reference materials to all the participants during the conference or after the conference. Alternatively, multiple participants may use the personally-owned mobile station 90*a* or the like to join a conference or the like, without using a shared communication terminal. However, the display 917 of the mobile station 90*a* is relatively small, and is not very much suitable when a conference or the like is held among a large amount of users. In order to deal with such a situation, in the present embodiment where a shared communication terminal is used to perform communication for a conference or the like, the communication management system 50 manages the participant circumstances of personal communication terminals (e.g., the mobile station 90*a*) or the like. Due to this configuration, a conference or the like can easily be held, and the destinations to which the data reference materials is to be distributed can easily specified. Hereinafter, more detailed description thereof is given.

Figure 14B:
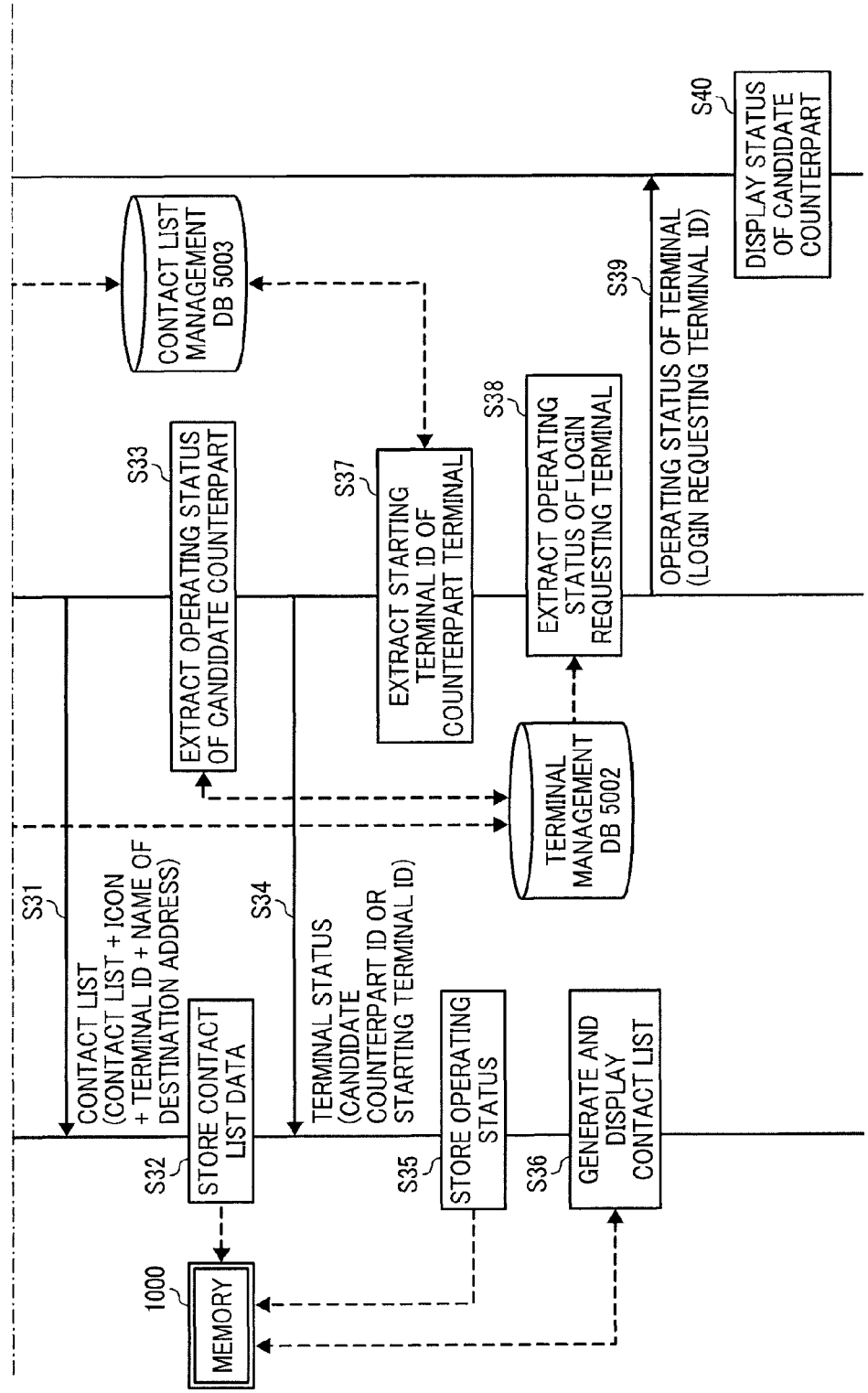

Firstly, the preparation processes for communication that the mobile station 90*a* performs as a login requesting terminal are described with reference to FIG. 14A, FIG. 14B, and FIG. 15. FIG. 14A and FIG. 14B are a sequence diagram illustrating the preparation processes for communication. FIG. 15A illustrates an example of a login screen of the mobile station 90*a*, according to the present embodiment. FIG. 15B illustrates an example of a contact list displayed on the mobile station 90*a*, according to the present embodiment. FIG. 15C illustrates an example of a contact list displayed on the communication terminal 10, according to the present embodiment.

Firstly, the display controller 94*a* of the mobile station 90*a* controls a display to display an initial screen 9100, such as a log-in screen, as illustrated in FIG. 15A. The initial screen 9100 displays an input field 9110 to which terminal ID is to be input and an input field 9120 to which a password is to be input. Note also that a key 9900 is to be touched to make a selection or instruction. When the terminal ID and the password of the user X is input to the input field 9110 and the input field 9120, respectively, the acceptance unit 92a receives the input of the terminal ID and the password (step S21). Then, the data transmitter and receiver 91a generates a session ID to identify the communication session (step S22).

Then, the data transmitter and receiver 91a transmits a login request indicating a login authentication request to the communication management system 50 through the communication networks 2 and 4 (step S23). The login request includes the terminal ID and the password input in the step S21.

Next, the data processor 59 of the communication management system 50 performs terminal authentication by searching the authentication management table of FIG. 9 using the terminal ID and the password included in the login request received via the data transmitter and receiver 51 as search keys, and determining whether the same terminal ID and the same password are managed (stored) in the authentication management table of FIG. 9 (step S24). In the present embodiment, it is assumed that the data processor 59 manages the same terminal ID and the same password.

When the data processor 59 manages the same terminal ID and the same password and determines that the login request is sent from an authorized terminal, the data processor 59 changes the operating status field of the terminal ID received in the step S23 as above to "online" in the record of the terminal management table (see FIG. 10), and stores, in the field of received date and time, the date and time at which the login request is received in the step S23 as above (step S25). For example, if the communication terminal 70a has the terminal ID "01ab", the data processor 59 stores the operating status "Online" and the received date and time "12:00, Apr. 9, 2015" in association with the IP address "1.2.1.4" in the terminal management table. Note that the IP address of the communication terminal may be transmitted from the mobile station 90a in the step S23 as above instead of being registered in the terminal management table in advance.

Subsequently, the data processor 59 adds a new record including the terminal ID and password of the personal communication terminal (i.e., the mobile station 90a) of the user, which was received in the step S23 as above, in the session management table (see FIG. 12) (step S26). Then, the data transmitter and receiver 51 of the communication management system 50 transmits authentication result information indicating an authentication result obtained in the step S24 to the mobile station 90a that has sent the above-mentioned login request, via the communication network 4 and the communication network 2 (step S27).

When the data transmitter and receiver 91a of the login requesting terminal (i.e., the mobile station 90a) receives the authentication result information indicating that the communication terminal 90a is an authorized terminal, the data transmitter and receiver 91a transmits a contact list request that requests a contact list to the communication management system 50 through the communication networks 4 and 2 (step S28). Accordingly, the data transmitter and receiver 51 of the communication management system 50 receives the contact list request.

Next, the data processor 59 of the communication management system 50 searches the contact list management table (see FIG. 11), using the terminal ID "01ab" of the login requesting terminal (i.e., the mobile station 90a) which has sent the login request as a search key, to extract the terminal ID of a candidate counterpart that can communicate with the login requesting terminal (i.e., the mobile station 90a). The data processor 59 of the communication management system 50 further reads out the name of destination address associated with each one of the extracted terminal ID from the terminal management table (see FIG. 10) (step S29). In the present embodiment, at least the terminal ID and the associated name of destination address, for each one of one or more candidate counterparts for the login requesting terminal (i.e., the mobile station 90a) with the terminal ID "01ab", are extracted.

Next, the data transmitter and receiver 51 of the communication management system 50 uses data processor 59 to read contact list frame data, and icon data indicating the operating status of each candidate counterpart terminal that is read, from the memory 5000 (step S30). The data transmitter and receiver 51 further transmits the contact list information to the login requesting terminal (i.e., the mobile station 90a) (step S31). The contact list information that is read using data processor 59 includes the contact list frame data, and the icon data, the terminal ID, and the terminal name of destination address. Accordingly, the data transmitter and receiver 91a of the login requesting terminal (i.e., the mobile station 90a) receives the contact list information, and the data processor 99a stores the received contact list information in the memory 9000a (step S32).

As described above, in the present embodiment, instead of managing contact list information at each communication terminal, the communication management system 50 centrally the list information for all of the communication terminals. In this way, even when a communication terminal is newly added to the communication system 1 or an existing communication terminal is replaced with a different type of communication terminal in the communication system 1, or even when the appearance of the contact list is changed, the communication management system 50 can centrally reflect such changes without requiring each communication terminal to reflect such changes in the contact list information.

The data processor 59 of the communication management system 50 searches the terminal management table (see FIG. 10) using the above extracted terminal ID of the candidate counterparts, as search keys, to obtain the operating status of the communication terminals (step S33).

Next, the data transmitter and receiver 51 of the communication management system 50 transmits terminal status information including the terminal ID that serves as the search keys used in the step S33 as described above and the operating status of the corresponding counterpart terminals to the starting terminal (i.e., the communication terminal 70a) via the communication network 4 (S34).

Next, the data processor 79a of the starting terminal (i.e., the communication terminal 70a) sequentially stores in the memory 7000a the terminal status information received from the communication management system 50 (step S35). Based on the terminal status information received for each candidate counterpart as described above, the starting terminal (i.e., the communication terminal 70a) can obtain the current operating status of a candidate counterpart for the starting terminal (i.e., the communication terminal 70a) such as the operating status of the communication terminal 10.

Next, the display controller 94a of the login requesting terminal (i.e., the mobile station 90a) generates a contact list that reflects the current operating status of each candidate counterpart based on the contact list information stored in the memory 9000a and the terminal status information, and the display controller 94a displays contact list page 9200 on the display 917, as illustrated in FIG. 15B (step S36). On the contact list page 9200, an icon indicating the operating status of each counterpart terminal and the names of the destination addresses are displayed as in counterpart terminal information 9230. In FIG. 20, the icons each reflecting the operating status of the corresponding terminal are displayed at left. In FIG. 15B, the icon indicating the operating status of a communication terminal "offline" is displayed on the top, and the icons indicating the operational status of terminals "online" are displayed below the icon of "offline".

The data processor 59 of the communication management system 50 searches the contact list management table (see FIG. 11) using the terminal ID "01ab" of the login requesting terminal (i.e., the mobile station 90a) as a search key, to extract the terminal ID of other communication terminals that register the terminal ID "01ab" as a candidate counterpart (step S37). In the contact list management table illustrated in FIG. 11, the terminal ID of other communication terminals to be extracted are, for example, "01aa" and "01ca".

Next, the data processor 59 of the communication management system 50 searches the contact list management table (see FIG. 10) using the terminal ID "01ab" of the login requesting terminal (i.e., the mobile station 90a) as a search key, and obtains the operating status of the login requesting terminal (i.e., the mobile station 90a) (step S38).

Then, the data transmitter and receiver 51 transmits counterpart terminal status information including the terminal ID "01ab" and the operating status "Online" of the login requesting terminal (i.e., the mobile station 90a) obtained in the step S38 to terminals whose operating status indicates "Online" in the terminal management table (see FIG. 10) among the terminals with the terminal ID extracted in the step S37 (step S39). When transmitting the counterpart terminal status information to the communication terminal 10, the data transmitter and receiver 51 uses the terminal ID and refers to the IP addresses of the terminals, which are managed in the terminal management table illustrated in FIG. 10. Accordingly, the terminal ID "01ab" and the operating status "online" of the login requesting terminal (i.e., the mobile station 90a) can be transmitted to other counterpart terminals that can communicate with the login requesting terminal (i.e., the mobile station 90a) as a candidate counterpart. As a result, the candidate counterpart (such as the communication terminal 10) can display the operating status of the candidate counterparts as illustrated in FIG. 15C (step S40).

Figure 16B:
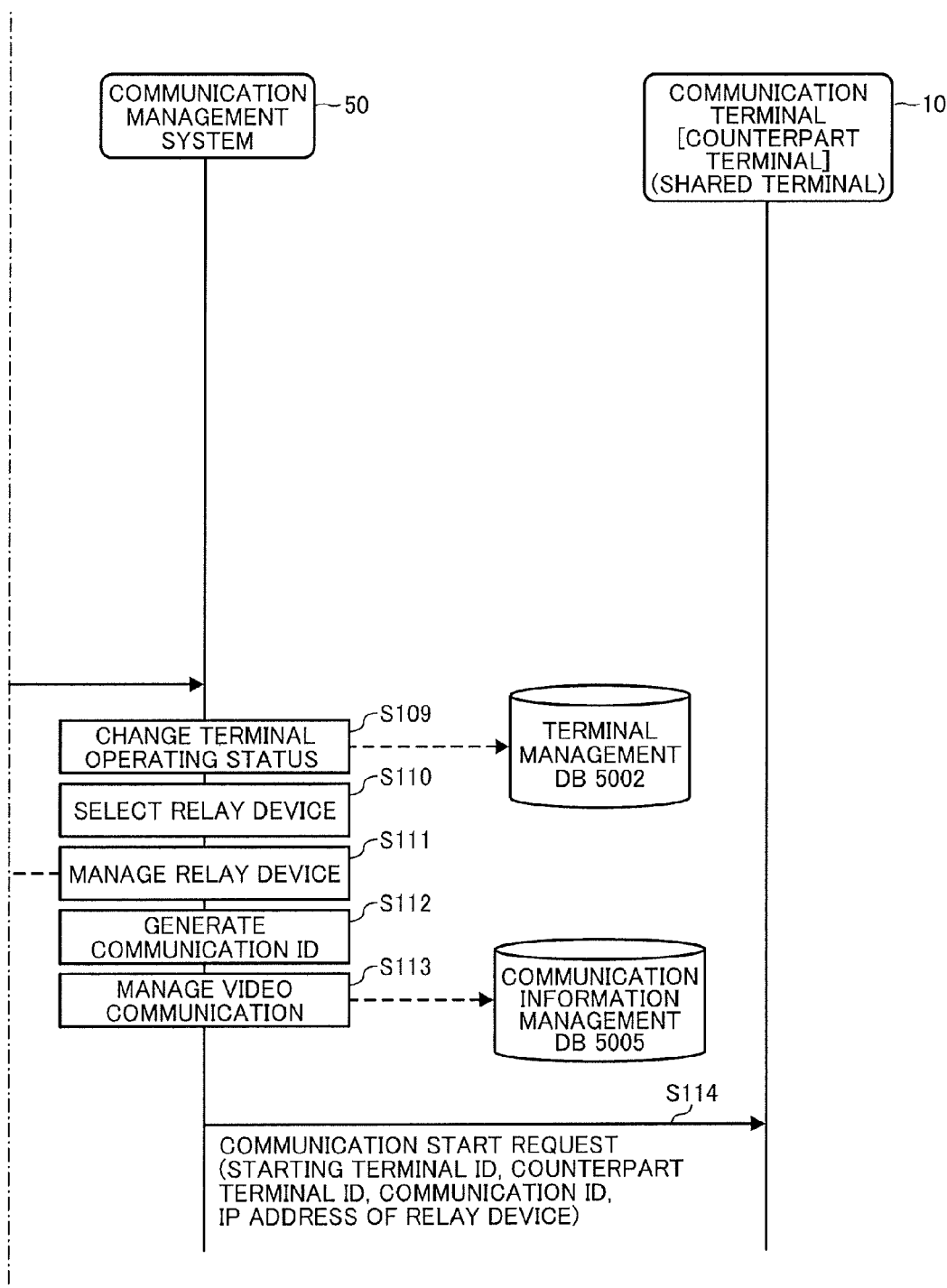

Next, with reference to FIG. 16A, FIG. 16B, and FIG. 17, cases are described where the user X having the personal communication terminal (i.e., the mobile station 90a) at the site A uses the shared communication terminal (i.e., the communication terminal 70a) to perform a conference or the like with the user Z using the shared communication terminal (i.e., the communication terminal 10) at the site C. FIG. 16A, FIG. 16B, and FIG. 17 are sequence diagrams illustrating the processes of starting video communication from a personal communication terminal (i.e., the mobile station 90a) at the site A to a shared communication terminal (i.e., communication terminal 10) at the site C through a shared communication terminal (i.e., the shared communication terminal 70a) at the site A, according to the present embodiment. Hereinafter, the description is given under the assumption that a shared communication terminal (communication terminal 70a), a personal communication terminal (mobile station 90a), and a shared communication terminal (communication terminal 10) have all completed the processes in the steps S21 to S40.

Firstly, the shared communication terminal (i.e., the communication terminal 70a) uses short-range radio communication such as Bluetooth to distribute a session establishment request within a prescribed area (for example, within a range of 20 meters (m) in radius) at regular time intervals (for example, for every 10 seconds) (step S101). The session establishment request includes terminal ID for identifying the shared communication terminal (i.e., the communication terminal 70a). When the personal communication terminal (i.e., the mobile station 90a) enters the above-described prescribed area after the distribution, the personal communication terminal (i.e., the mobile station 90a) receives the session establishment request. Then, the data transmitter and receiver 91a of the personal communication terminal (i.e., the mobile station 90a) transmits response information to the shared communication terminal (i.e., the communication terminal 70a) (step S102). Such response information includes the terminal ID of the personal communication terminal (i.e., the mobile station 90a). Accordingly, the shared communication terminal (i.e., the communication terminal 70a) receives the response information. Then, a communication session between the shared communication terminal (i.e., the communication terminal 70a) and the personal communication terminal (i.e., the mobile station 90a) is established by short-range radio communication (step S103).

Next, the determining unit 75a of the shared communication terminal (i.e., the communication terminal 70a) checks a video communication status indicating whether or not the local communication terminal is communicating with an external communication terminal for conference or the like (step S104). Here, the following description is given under the assumption that no video communication is being performed. The data transmitter and receiver 71a of the shared communication terminal (i.e., the communication terminal 70a) transmits communication status information indicating the communication status of "online" to the personal communication terminal (i.e., the mobile station 90a) (step S105). Accordingly, the data transmitter and receiver 91a of the personal communication terminal (i.e., the mobile station 90a) receives the communication status information.

Next, the personal communication terminal (i.e., the mobile station 90a) accepts a selection of the destination address of video communication (here, "CA TERMINAL, WASHINGTON D. C. OFFICE, U.S.") from the contact list illustrated in FIG. 15B (step S106). Accordingly, the data transmitter and receiver 91a transmits instructions to start communication to the shared communication terminal (i.e., the communication terminal 70a) by short-range radio communication (step S107). The instructions to start communication instruct the shared communication terminal (i.e., the communication terminal 70a) to request to start video communication with a communication terminal at the selected destination address. Due to this configuration, the mobile station 90a serves as a start-instructing terminal, and the communication terminal 70a serves as a starting terminal. The instructions to start communication includes the terminal ID of the start-instructing terminal (i.e., the mobile station 90a) and the terminal ID of the counterpart communication terminal at the selected destination address. Accordingly, the shared communication terminal (i.e., the communication terminal 70a) receives the instructions to start communication.

Next, the data transmitter and receiver 71a of the shared communication terminal (i.e., the communication terminal 70a), which serves as a starting terminal, transmits communication start request to the communication management system 50 (step S108). The communication start request requests to start video communication. The communication start request includes the terminal ID of the starting terminal (i.e., the communication terminal 70a), the terminal ID of the start-instructing terminal (i.e., the mobile station 90a), and the terminal ID of the counterpart terminal (i.e., the communication terminal 10). As a result, the data transmitter and receiver 51 of the communication management system 50 receives the communication start request.

Next, on the basis of the terminal ID "01aa" of the starting terminal (i.e., the communication terminal 70a), the terminal ID "01ab" of the start-instructing terminal (i.e., the mobile station 90a), and the terminal ID "01ca" of the counterpart terminal (i.e., the communication terminal 10), which are included in the communication start request, the data processor 59 of the communication management system 50 changes the operating status field of each of records including the above-mentioned terminal ID "01ab", terminal ID "01ab", and the terminal ID "01ca" to all "communicating" in the terminal management table (see FIG. 10) (step S109). Note that although the starting terminal and the counterpart terminal have not yet started video communication for a conference or the like, the communication status of these communication terminals becomes "communicating (communication established)", and the icons that indicate the communication status of these communication terminals are changed to ones that indicate "communicating" in the contact list displayed on an external communication terminal such as the mobile station 90b.

Subsequently, the selection unit 53 of the communication management system 50 selects the nearest relay device based on the IP address of a starting terminal and the IP address of a counterpart terminal (step S110). The IP addresses of terminals are managed in the terminal management table, and the device ID the IP addresses of relay devices for identifying the relay devices are stored in the memory 5000 in advance.

Subsequently, the data processor 59 adds the device ID of the relay device selected in the step S110 to the field (item) of the device ID of a relay device of the record where the terminal ID of a starting terminal includes the starting terminal (i.e., the communication terminal 70a), in the session management table (see FIG. 12) (step S111).

Next, the generator 54 generates communication ID (step S112). Then, the data processor 59 stores the communication ID "co01" generated in the step S112, the terminal ID "01aa" of the starting terminal (i.e., the communication terminal 70a) received in the step S108, and the terminal ID "01ab" of the start-instructing terminal (i.e., the mobile station 90a), in the communication information management table (see FIG. 13), in association with each other (step S113).

Subsequently, the data transmitter and receiver 51 transmits the communication start request to the counterpart terminal (i.e., the communication terminal 10) (step S114). The communication start request requests to start video communication. The communication start request includes the terminal ID of the starting terminal (i.e., the communication terminal 70a), the terminal ID of the counterpart terminal (i.e., the communication terminal 10), the communication ID, and the IP address of the relay device. Accordingly, the data transmitter and receiver 11 of the counterpart terminal (i.e., the communication terminal 10) receives the communication start request. Note also that the IP address of the relay device is the IP address of the relay device selected in the step S110.

Subsequently, as illustrated in FIG. 17, the acceptance unit 72d of the counterpart communication terminal accepts a response from a user Z to start the video communication requested to start in the step S114 (step S121). Then, the data transmitter and receiver 71d transmits affirmative or negative response information to the communication management system 50 (step S122). The affirmative or negative response information includes the terminal ID of the starting terminal (i.e., the communication terminal 70a) and the terminal ID of the counterpart terminal (i.e., the communication terminal 10). As a result, the data transmitter and receiver 51 of the communication management system 50 receives the response to the affirmative or negative response information. In the present embodiment, cases where the affirmative or negative response information indicates an affirmative response are described as follows.

Next, the data processor 59 of the communication management system 50 associates the terminal ID of the communication terminal 10 that serves as a counterpart terminal with the terminal ID of the communication terminal 70a that serves as a starting terminal, based on the affirmative response, in the session management table (see FIG. 12) (step S123). Due to this configuration, the communication management system 50 can manage what pair of communication terminals perform video communication through what relay device in what communication session.

Next, as depicted in FIG. 13, the data processor 59 of the communication management system 50 associates the terminal ID of the starting terminal "01aa" and the terminal ID of the counterpart terminal "01ca", as the terminal ID of shared communication terminals, with the same communication ID "co01" (step S124). Due to this configuration, the communication management system 50 can manage what pair of shared communication terminals are communicating with each other in what conference or the like indicated by communication ID, and can manage a user with what personal communication terminal is participating.

Then, the data transmitter and receiver 51 transmits affirmative or negative response information to the starting terminal. In this case, the affirmative or negative response information includes the communication ID associated in the step S124 and the IP address of the relay device selected in the step S111. As a result, the data transmitter and receiver 71a of the starting terminal receives the affirmative or negative response information (step S125).

Subsequently, the data transmitter and receiver 71d of the counterpart terminal sends an establishment request to the IP address of the relay device received in the step S114 (step S126). The establishment request indicates a request to establish a video communication session, and the establishment request includes the terminal ID of the starting terminal and the terminal ID of the counterpart communication terminal. At the same time, the IP address of the counterpart communication terminal is also sent. On the other hand, the data transmitter and receiver 71a of the starting terminal sends an establishment request to the IP address of the relay device received in the step S125 (step S127). The establishment request indicates a request to establish a video communication session, and the establishment request includes the terminal ID of the starting terminal and the terminal ID of the counterpart communication terminal. At the same time, the IP address of the starting terminal is also sent. Accordingly, a communication session in which the relay device 30 and the starting terminal send and receive image data and audio data to and from each other is established (step S128-1), and a communication session in which the relay device 30 and the counterpart communication terminal send and receive image data and audio data to and from each other is established (step S128-2).

Next, with reference FIG. 18A to FIG. 20, the processes are described in which the user Y having a personal communication terminal (i.e., the mobile station 90b) at the site A newly jumps in (additionally participates in) video communication for a conference or the like.

Figure 18B:
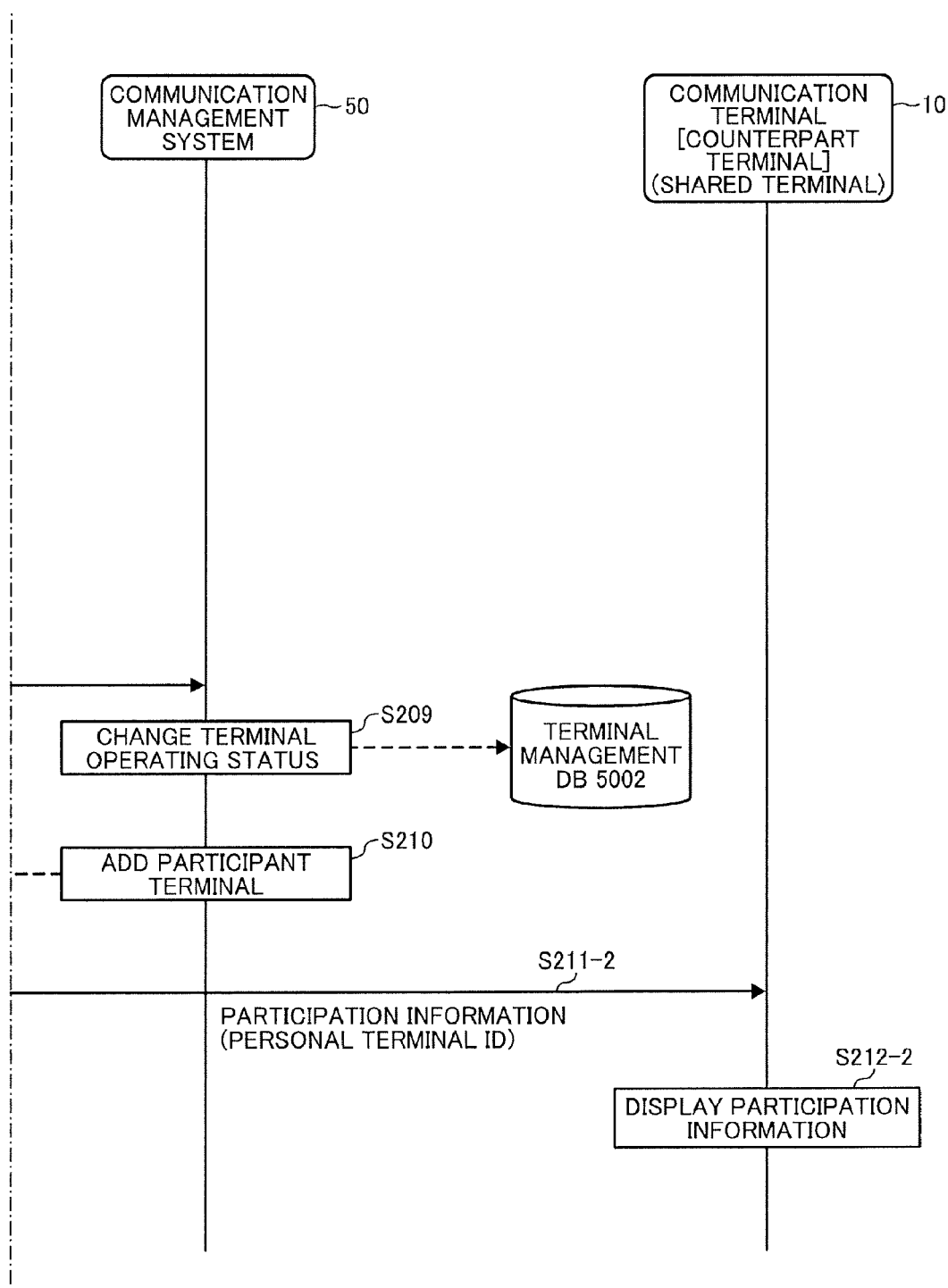

FIG. 18A and FIG. 18B are a sequence diagram illustrating the processes in which a personal communication terminal (mobile station 90b) jumps in (additionally participates in) video communication, according to the present embodiment.

Figure 19B:
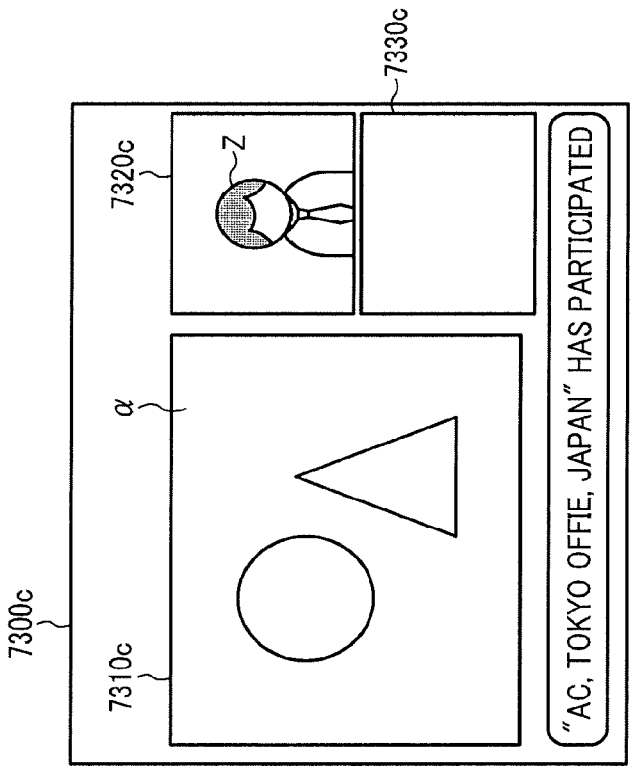
FIG. 19B is a diagram illustrating an example of the screen on a communication terminal 10 side during video communication, according an embodiment of the present invention.
Figure 19A:
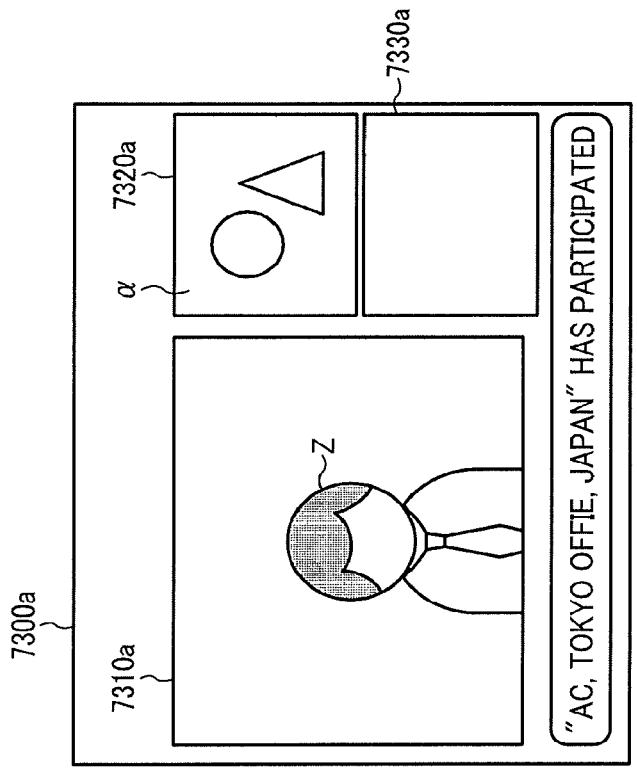
FIG. 19A is a diagram illustrating an example of the screen on a communication terminal 70a side during video communication, according an embodiment of the present invention.

FIG. 19A is a diagram illustrating an example of the screen on the communication terminal 70a side during the video communication, according the present embodiment. FIG. 19B is a diagram illustrating an example of the screen on the communication terminal 10 side during the video communication, according the present embodiment.

Figure 20B:
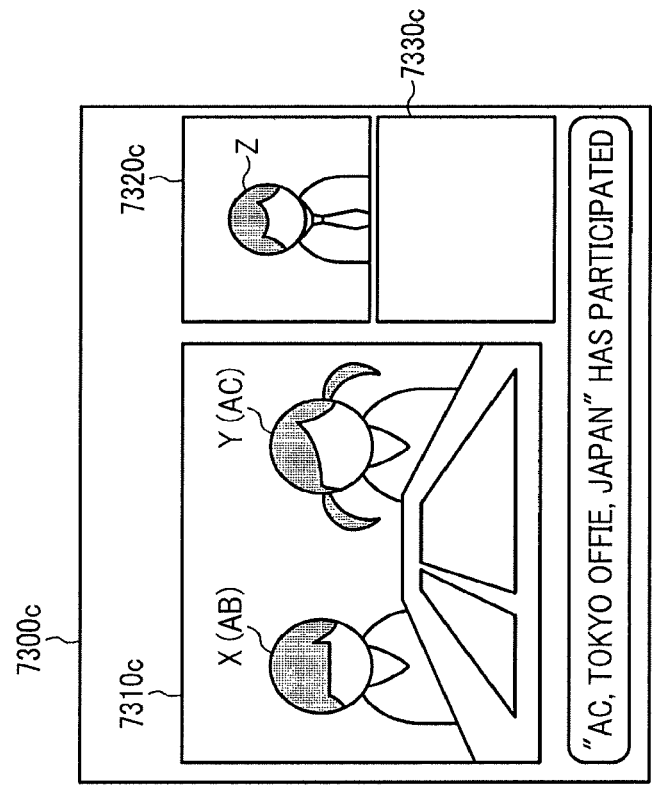
FIG. 20B is a diagram illustrating an example of the screen on a communication terminal 10 side during video communication, according an embodiment of the present invention.
Figure 20A:
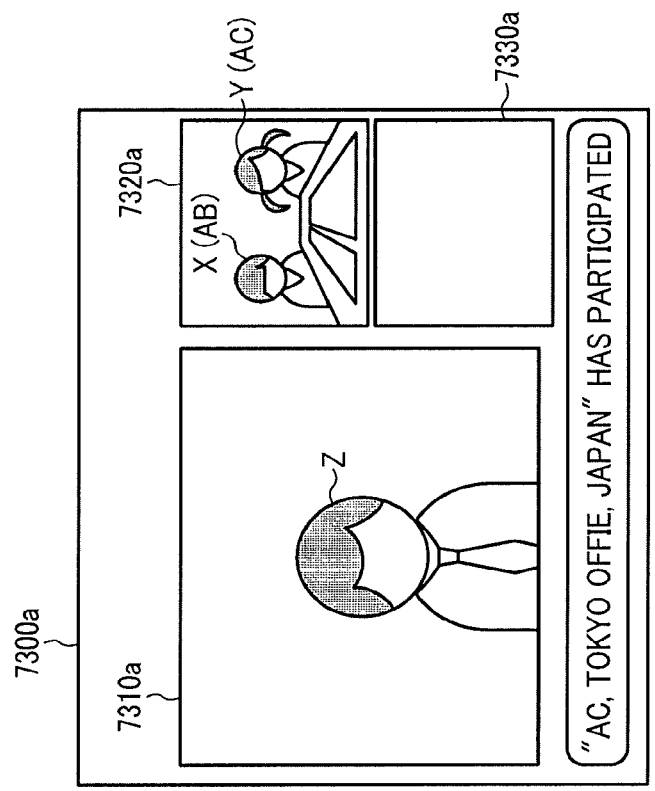
FIG. 20A is a diagram illustrating an example of the screen on a communication terminal 70a side during video communication, according an embodiment of the present invention.

FIG. 20A is a diagram illustrating an example of the screen on the communication terminal 70a side during the video communication, according the present embodiment.

FIG. 20B is a diagram illustrating an example of the screen on the communication terminal 10 side during the video communication, according the present embodiment.

Hereinafter, the description is given under the assumption that a personal communication terminal (i.e., the mobile station 90b in the present embodiment) has already completed the processes in the steps S21 to S40.

As illustrated in FIG. 18A and FIG. 18B, a shared communication terminal (i.e., the communication terminal 70a) and the personal communication terminal (i.e., the mobile station 90b) perform processes similar to those of the steps S101 to S103. Then, the determining unit 75a of the shared communication terminal (i.e., the communication terminal 70a) checks the status of video communication (step S204). In the present embodiment, the determining unit 75a determines that the status is in "communicating (communication established)" as the shared communication terminal (i.e., the communication terminal 70a) has already started the video communication with another shared communication terminal (i.e., the communication terminal 10). Then, when a user Y selects a candidate counterpart with an icon indicating the operating status "communicating (communication established)" from a contact list, the acceptance unit 92b of the mobile station 90b accepts jump-in participation (additional participation) (step S206). Note that when the user Y selects a candidate counterpart with an icon indicating the operating status "online" from the contact list on the mobile station 90b side, the processing proceeds to the processes in the step S106 and the following steps depicted in FIG. 16A and FIG. 16B.

Subsequently, the data transmitter and receiver 91b transmits instructions for participation to the shared communication terminal (i.e., the communication terminal 70a) by short-range radio communication (step S207). The instructions for participation instruct the shared communication terminal (i.e., the communication terminal 70a) to request the communication management system 50 to let the participant terminal (i.e., the mobile station 90b) jump in (additionally participate in) a conference or the like being performed by the shared communication terminal. Such instructions for participation include the terminal ID of the participant communication terminal (i.e., the mobile station 90b). Accordingly, the shared communication terminal (i.e. communication terminal 70a) receives the instructions for participation.

Next, the data transmitter and receiver 71a of the shared communication terminal (i.e., the communication terminal 70a), which serves as a starting terminal, transmits participation request to the communication management system 50 (step S208). The participation request requests jump-in participation in video communication. The participation request includes the communication ID indicating a conference or the like to participate in, the terminal ID of the shared communication terminal (i.e., the communication terminal 70a) to which instructions for jump-in participation have been sent, and the terminal ID of the participant communication terminal (i.e., the mobile station 90b) that requests jump-in participation. As a result, the data transmitter and receiver 51 of the communication management system 50 receives the participation request. Note also that the communication ID is received in the step S125 as described above.

Subsequently, on the basis of the terminal ID "01ac" of the participant terminal (i.e., the mobile station 90b) included in the participation request, the data processor 59 of the communication management system 50 changes the operating status field of each of records including the above-mentioned terminal ID "01ac" to "communicating" in the terminal management table (see FIG. 10) (step S209).

Then, the data processor 59 associates the terminal ID "01ac" of the participant terminal (i.e., the mobile station 90b), which is received in the step S208, with the communication ID "co01" and the terminal ID "01aa" of the shared communication terminal (i.e., the communication terminal 70a), each of which is received in the step S208, in the communication information management table (see FIG. 13) (step S210). Accordingly, as illustrated in FIG. 13, not only the terminal ID "01ab" of a personal communication terminal (i.e., the mobile station 90a) that participates in a video communication from the beginning but also the terminal ID "01ac" of a personal communication terminal (mobile station 90b) that jumped in the video communication afterward are associated with the terminal ID "01aa" of a shared communication terminal. When a personal communication terminal is used on the site C side, in a similar manner to the above, the terminal ID of the personal communication terminal is associated with the terminal ID "01ca" of the shared communication terminal in the communication information management table (see FIG. 13).

Subsequently, the data transmitter and receiver 51 transmits a participation notification to the shared communication terminal (i.e., the communication terminal 70a) on one side (step S211-1), and transmits the participation notification to the shared communication terminal (i.e., the communication terminal 10) on the other side (step S211-2). The participation notification indicates that a communication terminal has jumped in the video communication. Note also that the participation notification includes the terminal ID "01ac" of the participant terminal (i.e., the mobile station 90b) that has jumped in the video communication. Accordingly, the data transmitter and receiver 71a of the shared communication terminal (i.e., the communication terminal 70a) receives the participation notification, and the data transmitter and receiver 11 of the shared communication terminal (i.e., the communication terminal 10) receives the participation notification. As the communication terminals at the site A are aware of the participant, the data transmitter and receiver 51 may transmit the participation notification only to the site C.

In the shared communication terminal (i.e., the communication terminal 70a), the display controller 74a controls the display 753 to display a communication screen 7300a thereon as illustrated in FIG. 19A (step S212-1). In a similar manner, in the shared communication terminal (i.e., the communication terminal 10), the display controller 14 controls the display 120 to display a communication screen 7300c thereon as illustrated in FIG. 19B (step S212-2).

As illustrated in FIG. 19A, on the communication screen 7300a of the shared communication terminal (i.e., the communication terminal 70a) at the site A, a display area 7310a and a display area 7320a are displayed. The display area 7310a indicates an image on the communication terminal 10 side (i.e., the image of the figure of the user Z in the present embodiment), and the display area 7320a indicates an image on the communication terminal 70a (local terminal) side (i.e., a drawing α in the present embodiment. Moreover, a display area 7330a is displayed on the communication screen 7300a. When a third shared communication terminal participates in the video communication or the like at some midpoint, display area 7330a displays an image on such a third shared communication terminal side. Further, the display controller 74a displays a participation message on the communication screen 7300a based on the terminal ID of a personal communication terminal (i.e., the mobile station 90b in the present embodiment) received in the step S211-1 and the terminal ID and the names of the destination addresses in the contact list information received in the step S31. For example, the participation message "AC, TOKYO OFFIE, JAPAN has participated" is displayed on the communication screen 7300a.

On the other hand, as illustrated in FIG. 19B, on the communication screen 7300c of the shared communication terminal (i.e., the communication terminal 10) at the site C, a display area 7310c and a display area 7320c are displayed. The display area 7310c indicates an image on the communication terminal 70a side (i.e., the image of the drawing α in the present embodiment), and the display area 7320c indicates an image on the communication terminal 10 (local terminal) side (i.e., the image of the figure of the user Z in the present embodiment. Moreover, a display area 7330c is displayed on the communication screen 7300c. When a third shared communication terminal participates in the video communication or the like at some midpoint, display area 7330c displays an image on such a third shared communication terminal side. Further, the display controller 14 displays a participation message on the communication screen 7300c based on the terminal ID of a personal communication terminal (i.e., the mobile station 90b in the present embodiment) received in the step S211-2 and the terminal ID and the names of the destination addresses in the contact list information received in the step S31. For example, the participation message "AC, TOKYO OFFIE, JAPAN has participated" is displayed on the communication screen 7300a.

Note also that the communication screens 7300a and 7300c as illustrated in FIG. 19A and FIG. 19B may be switched from the drawing on the site A to the image of the figures of users (i.e., the users X and Y in the present embodiment) on the site A side, respectively, as illustrated in FIG. 20A and FIG. 20B. However, when the figures of users are displayed as above, the user Z at the site C can visually recognize who is participating at the site A but cannot view the drawing as illustrated in FIG. 19B. By contrast, when the drawing is displayed but the figures of users at the site A are not displayed as illustrated in FIG. 19B, it is difficult for the user Z at the site C to recognize who is participating at the site A. However, in the present embodiment, the communication management system 50 manages the terminal ID of the personal communication terminals owned by the participating users in the communication information management table (see FIG. 13). Due to this configuration, when the user Z at the site C wishes to distribute the data of reference materials during or after the conference or the like, he or she can easily figure out the destinations to which the data of reference materials are to be distributed by obtaining the terminal ID of the personal communication terminals of the users who are participating in (or participated in) the conference or the like from the communication management system 50.

According to the embodiments described above, the communication management system 50 associates the shared communication terminals used in video communication for a conference or the like with the personal communication terminals owned by the users who participate in the video communication in the communication information management table (see FIG. 13). Due to this configuration, a user who wishes to send the data of reference materials to participants during or after a conference or the like can easily specify the destinations to which the data reference materials is to be sent.

Moreover, the communication management system 50 notifies each communication terminal of a jumped-in user if any. Due to this configuration, as illustrated in FIG. 19A to FIG. 20B, a user at each site can easily figure out who has jumped-in a video communication.

While the personal communication terminals (i.e., the mobile stations 90a and 90b) can start the communication with a counterpart terminal on their own, the personal communication terminal can also serve as a handy remote control for the shared communication terminal (i.e., the communication terminal 70a).

In the above-described embodiments, terminal ID of communication terminals is exchanged among personal communication terminals and shared communication terminals by short-range radio communication. However, no limitation is indicated thereby and the terminal ID may be exchanged by cable communications using, for example, a USB cable. Alternatively, the terminal ID may be exchanged using a QR code that indicates the terminal ID of a communication terminal. Such a QR code indicating the terminal ID of a communication terminal on one side is displayed on the display of a communication terminal on the other side, and the displayed QR code is read on the other side to obtain the terminal ID of the communication terminal.

Cases where a video conference terminal or an electronic whiteboard is used as a communication terminal, which is an example of office equipment, have been described. However, no limitation is intended therein. The communication terminal may be an Internet protocol (IP) phone, an Internet phone, a car navigation terminal, or a surveillance camera. In alternative to the video conference terminal and the electronic whiteboard, any other type of office equipment may be used such as a printer, facsimile, and multifunction peripheral (MFP). The communication terminal may be implemented as medical equipment, such as an endoscope, a Computed Tomography (CT) scan, and radiotherapy equipment.

Further, in alternative to the smart phone, any other mobile terminal may be used, such as a portable phone, digital camera, portable game machine, IC card, or wearable computer. A wearable computer includes, for example, a smart watch and a head-mounted display.

In addition, although image data and audio data are described as examples of contents of data in the above-described embodiment, the contents of data are not limited to these items of data, and the contents of data may be touch data. In this case, a feeling obtained by a user's contact at one terminal side is transmitted to the other terminal side. Further, the content data may be smell data. In this case, a smell at one terminal side is transmitted to the other terminal side. Based on the received data of smell, a smell generator, which may be incorporated in or connected to the other terminal, may generate a smell based on such received data. The contents of data may be at least one of image data, audio data, touch data, and smell data.

Although the case in which a video conference is held by the communication system 1 has been described in the above-described embodiment, the embodiment is not limited to this case. The communication system 1 may be used in meetings, general conversation between family members or friends, or one-way presentation of information.

In the above-described embodiments, a request for storing processes or a request for reading processes are transmitted or received by short-range radio communication such as near-field communication (NFC). However, such requests may be transmitted or received by ultrasonic communication.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A communication management system, comprising:
   a receiver to receive, a communication start request for starting a video communication between a first shared communication terminal and a second shared communication terminal to be shared by a plurality of users, the communication start request including first shared communication terminal identification information identifying the first shared communication terminal used for the video communication and first personal communication terminal identification information identifying a first personal communication terminal of a first user of the plurality of users who requests to start the video communication using the first shared communication terminal; and
   processing circuitry to store, in a memory, the first shared communication terminal identification information and the first personal communication terminal identification information in association with each other.

2. The communication management system according to claim 1, wherein
   the receiver further receives, a participation request for participating in the video communication that is established between the first shared communication terminal and the second shared communication terminal, the participation request including second personal communication terminal identification information identifying a second personal communication terminal of a second user of the plurality of users who additionally participates in the video communication, and
   the processing circuitry further stores, in the memory, the second personal communication terminal identification information in association with the first shared communication terminal identification information.

3. The communication management system according to claim 1, wherein
   the receiver further receives, from the second shared communication terminal, second shared communication terminal identification information identifying the second shared communication terminal, and
   the processing circuitry further stores, in the memory, the second shared communication terminal identification information in association with the first shared communication terminal identification information.

4. The communication management system according to claim 2, further comprising:
   a transmitter to transmit, to the second shared communication terminal, a participation notification indicating that the second personal communication terminal has additionally participated in the video communication after the second personal communication terminal identification information is stored.

5. The communication management system according to claim 4, wherein
   the transmitter further transmits, to the first shared communication terminal, a participation notification indicating that the second personal communication terminal has additionally participated in the video communication after the second personal communication terminal identification information is stored.

6. A communication system comprising:
   the communication management system according to claim 1; and
   the first shared communication terminal.

7. The communication system according to claim 6, wherein the first shared communication terminal comprises:
   first circuitry to determine whether the first shared communication terminal is able to communicate with or is communicating with the second shared communication terminal; and
   a first transmitter to transmit, to the first personal communication terminal, communication status information indicating that the first shared communication terminal is communicating with the second shared communication terminal when the first circuitry determines that the first shared communication terminal is communicating with the second shared communication terminal.

8. The communication system according to claim 7, wherein
   when the first circuitry determines that the first shared communication terminal is able to communicate with the second shared communication terminal,
   the first transmitter of the first shared communication terminal transmits, to the first personal communication terminal, communication status information indicating that the first shared communication terminal is able to communicate with the second shared communication terminal.

9. A method of managing communication, the method comprising:
   receiving a communication start request for starting a video communication between a first shared communication terminal and a second shared communication terminal to be shared by a plurality of users, the communication start request including first shared communication terminal identification information identifying the first shared communication terminal used for the video communication and first personal communication terminal identification information identifying a first personal communication terminal of a first user of the plurality of users who requests to start the video communication using the first shared communication terminal; and storing, in a memory, the first shared communication terminal identification information and the first personal communication terminal identification information in association with each other.

10. The method according to claim 9, wherein the receiving further includes receiving a participation request for participating in the video communication that is established between the first shared communication terminal and the second shared communication terminal, the participation request including second personal communication terminal identification information identifying a second personal communication terminal of a second user of the plurality of users who additionally participates in the video communication, and the storing further includes storing, in the memory, the second personal communication terminal identification information in association with the first shared communication terminal identification information.

11. The method according to claim 9, wherein the receiving further includes receiving, from the second shared communication terminal, second shared communication terminal identification information identifying the second shared communication terminal, and the storing further includes storing, in the memory, the second shared communication terminal identification information in association with the first shared communication terminal identification information.

12. The method according to claim 10, further comprising:

transmitting, to the second shared communication terminal, a participation notification indicating that the second personal communication terminal has additionally participated in the video communication after the second personal communication terminal identification information is stored.

13. The method according to claim 12, wherein the transmitting further includes transmitting, to the first shared communication terminal, a participation notification indicating that the second personal communication terminal has additionally participated in the video communication after the second personal communication terminal identification information is stored.

14. The method of claim 9, further comprising establishing communication between the first shared communication terminal and the first personal communication terminal using a near-field communication protocol.

\* \* \* \* \*